(12) United States Patent
Niu

(10) Patent No.: US 9,291,820 B2
(45) Date of Patent: Mar. 22, 2016

(54) DISPLAY MODULE AND HEAD UP DISPLAY

(71) Applicant: Au Optronics Corporation, Hsinchu (TW)

(72) Inventor: Tzu-Ling Niu, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/291,003

(22) Filed: May 30, 2014

(65) Prior Publication Data

US 2015/0168717 A1    Jun. 18, 2015

(30) Foreign Application Priority Data

Dec. 12, 2013    (TW) .............................. 102145903 A

(51) Int. Cl.
*G02B 27/14*    (2006.01)
*G02B 27/01*    (2006.01)

(52) U.S. Cl.
CPC ........ *G02B 27/0101* (2013.01); *G02B 27/0172* (2013.01); *G02B 2027/015* (2013.01); *G02B 2027/0161* (2013.01)

(58) Field of Classification Search
CPC ........... G02B 27/0172; G02B 27/0101; G02B 27/017; G02B 27/01; G02B 6/00; G02B 6/0055; G02B 6/0068; G02B 6/0073; G02B 13/18; G02B 1/041; G02B 2027/0181; G02B 6/0018; H01L 51/5275; H01L 51/5271; H01L 33/20

See application file for complete search history.

(56) References Cited

U.S. PATENT DOCUMENTS

| 7,554,625 | B2 | 6/2009 | Koganezawa | |
|---|---|---|---|---|
| 2008/0019148 | A1* | 1/2008 | Chou | 362/612 |
| 2009/0027589 | A1* | 1/2009 | Yamazoe et al. | 349/62 |

FOREIGN PATENT DOCUMENTS

| TW | 200521554 | 7/2005 |
|---|---|---|
| TW | M319427 | 9/2007 |
| TW | I288851 | 10/2007 |
| TW | 201126776 | 8/2011 |
| TW | I353479 | 12/2011 |

* cited by examiner

*Primary Examiner* — Alicia M Harrington
(74) *Attorney, Agent, or Firm* — Jianq Chyun IP Office

(57) ABSTRACT

A display module including light emitting units and a display panel is provided. Each of the light emitting units includes a light source and a light converging element. The light emitting units are divided into at least one first light emitting unit row and a second light emitting unit row adjacent to the first light emitting unit row. Top surfaces of the light converging elements of the first light emitting unit row are disposed on a first surface. Top surfaces of the light converging elements of the second light emitting unit row are disposed on a second surface. The first surface is located between the display panel and the second surface. Moreover, a head up display including the display module is also provided.

13 Claims, 15 Drawing Sheets

DISPLAY MODULE AND HEAD UP DISPLAY

CROSS-REFERENCE TO RELATED APPLICATION

This application claims the priority benefit of Taiwan application serial no. 102145903, filed on Dec. 12, 2013. The entirety of the above-mentioned patent application is hereby incorporated by reference herein and made a part of this specification.

BACKGROUND

1. Technical Field

The invention disclosure relates to two optoelectronic devices, and more particularly to a display module and a head up display.

2. Description of Related Art

Head up displays are frequently applied to aircrafts as supplementary equipment of aviation. Some automobiles are also equipped with the head up displays, so as to project status data (e.g., car speed, rotation speed, engine coolant temperature, whether car doors are closed, mileage, fuel consumption, etc.) of the automobiles onto the windshields for drivers' reference.

Generally, the head up display includes a display module and several curved surface reflectors. The curved surface reflectors are configured to transmit an image beam emitted by the display module to the windshields, so that the image beam may be reflected by the windshields for imaging in front of the drivers. As a divergence of the image beam gets greater, increase in a volume of the curved surface reflectors are required in order to effectively receive the image beam, which is disadvantageous in reducing the volume of the head up display.

To solve above-said problem, some have attempted to dispose a plurality of light converging elements respectively between a display panel of the display module and a plurality of light sources, so as to decrease the divergence of the image beam. However, each time after passing through the light converging element, the illuminating beam is focused towards an optical axis corresponding to the light source, thus the illuminating beam having insufficient brightness is received by a region of the display panel of the display module corresponding to intersections between multiple light converging elements (i.e., an edge of each of the light converging elements), resulting occurrence of non-uniform display in the display module.

SUMMARY

The embodiments of the invention are directed to a display module, which has a favorable displaying effect.

The embodiments of the invention are directed to a head up display, which has a favorable displaying effect.

A display module including a plurality of light emitting units and a display panel is provided. Each of the light emitting units includes a light source and a light converging element. The light source is suitable for emitting an illuminating beam. The light converging element is disposed in a transmitting path of the illuminating beam, and including a bottom surface adjacent to the light source, a top surface far away from the light source and opposite to the bottom surface, and a peripheral surface connecting the bottom surface and the top surface. The display panel is disposed in the transmitting path of the illuminating beam emitted by each of the light emitting units. The light emitting units are divided into at least one first light emitting unit row and a second light emitting unit row adjacent to the first light emitting unit row. Top surfaces of the light converging elements of the first light emitting unit row are disposed on the same first surface. Top surfaces of the light converging elements of the second light emitting unit row are disposed on the same second surface. The first surface is located between the display panel and the second surface. An intersection between the top surface and the peripheral surface of each of the light converging elements of the second light emitting unit row is in contact with the peripheral surface of at least one of the light converging elements of the first light emitting unit row.

A head up display including above-said display module is also provided. The head up display is disposed under a light transmissive windshield component of a vehicle. The illuminating beams emitted by the light emitting units are converted into a plurality of image beams after passing through the display panel. The image beams are projected on the light transmissive windshield component of the vehicle to form an image.

Based on above, in the display module and the head up display according to an embodiment of the invention, the light converging elements of the light emitting units on different rows are spaced apart in up and down manner and in contact to each other. Therefore, arranging gap between the light converging elements of two adjacent light emitting unit rows may be reduced, so as to increase the area of the overlap region projected on the display panel by the illuminating beams emitted by the two. Accordingly, the brightness at the region where the two adjacent light emitting unit rows are intersected may be increased, so as to solve the problem of poor display in conventional art due to insufficient brightness at the region corresponding to where the two adjacent light emitting unit rows are intersected.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
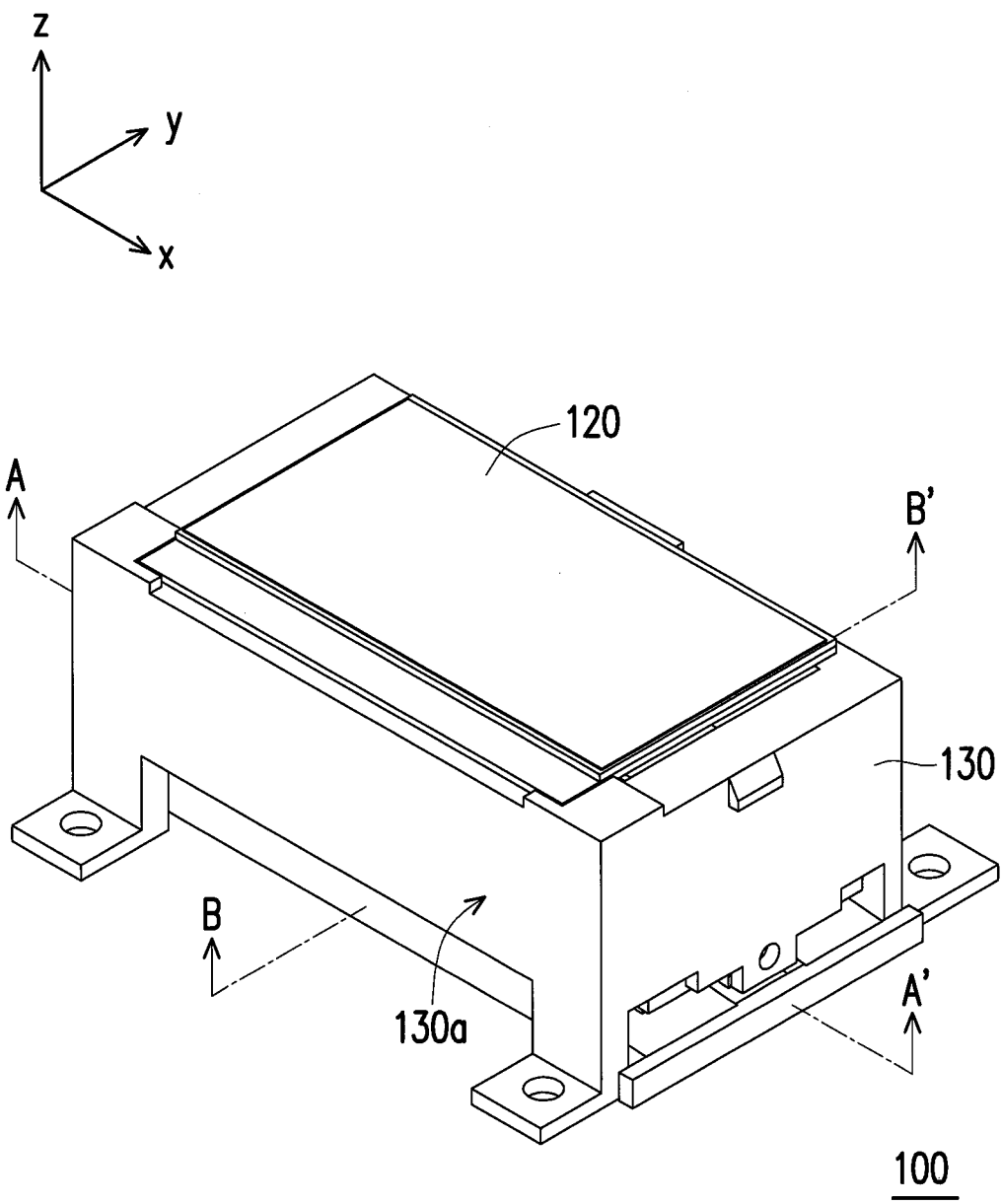
FIG. 1 is a three-dimensional diagram of a display module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
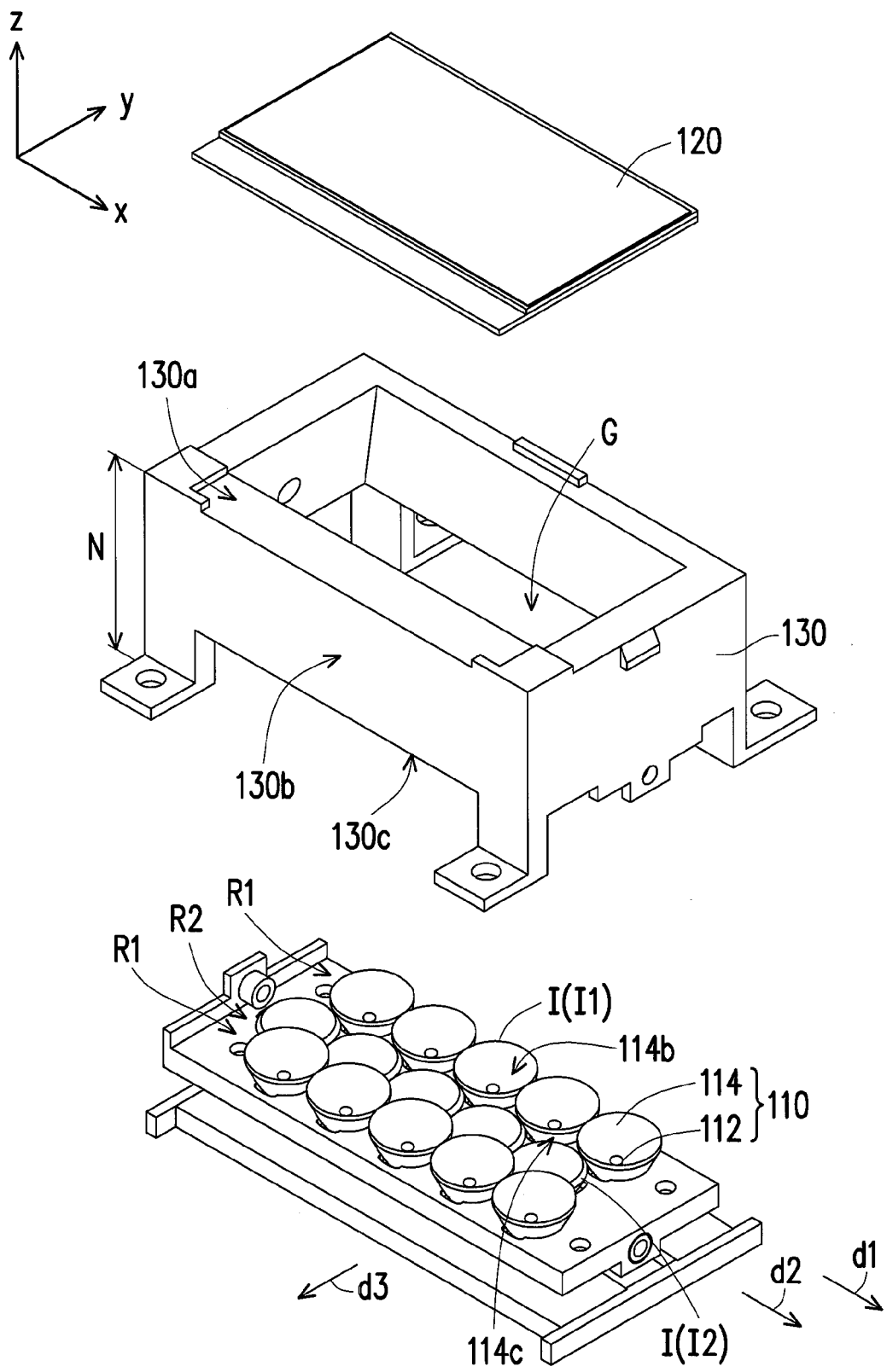
FIG. 2 is an explosion diagram of the display module depicted in FIG. 1.

FIG. 1 is a three-dimensional diagram of a display module according to an embodiment of the invention. FIG. 2 is an explosion diagram of the display module depicted in FIG. 1. Referring to FIG. 1 and FIG. 2, a display module 100 of the present embodiment includes a plurality of light emitting units 110, and a display panel 120 disposed in a transmitting path of an illuminating beam L1 (marked in FIG. 3A) emitted by the light emitting unit 110. The display panel 120 may be of transitive or transflective types, based on actual requirements. In the present embodiment, the display panel 120 may be, for example, a liquid crystal display panel. However, the invention is not limited thereto. In other embodiments, the display panel 120 may also be other appropriate display panels.

The display module 100 of the present embodiment may further include a support carrier 130. The support carrier 130 is disposed between the display panel 120 and the light emitting units 110. The support carrier 130 includes a upper surface 130a, a lower surface 130c opposite to the upper surface 130a, and a sidewall 130b connecting the upper surface 130a and the lower surface 130c. The display panel 120 is mounted on the upper surface 130a of the support carrier 130 for maintaining a proper distance away from the light emitting units 110. Furthermore, the support carrier 130 has a specific height N, so that a gap G may be maintained between the display panel 120 mounted on the upper surface 130a of the support carrier 130 and the light emitting units 110 covered under the support carrier 130. A height of the gap G is far more than a total of a thickness of one light emitting unit 110 and a thickness of the display panel 120. Accordingly, when it is intended to increase a brightness of the light emitting unit 110 for providing the display module 100 with high brightness, waste heat generated by the light emitting unit 110 may be conducted to the sidewall 130b of the support carrier 130 through a medium (e.g., air) in the gap G to leave the display module 100 without overly accumulated on the display panel 120 to cause bad influences to a reliability of the display panel 100.

Figure 3A:
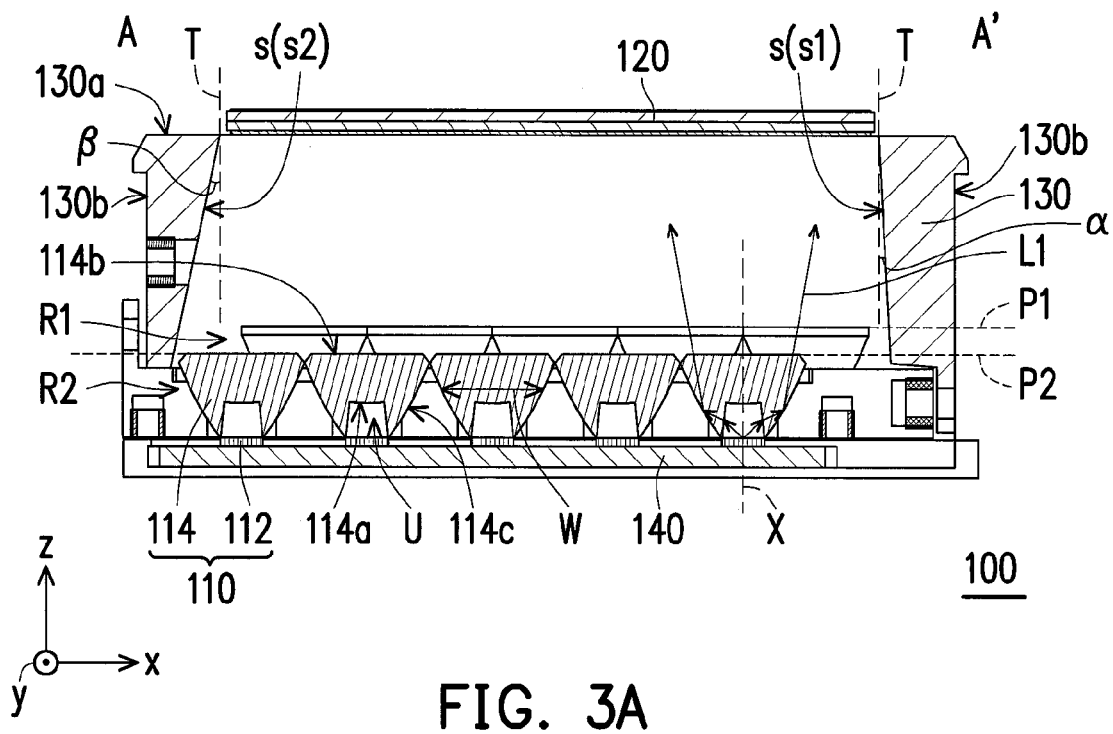
FIG. 3A is a cross-sectional diagram illustrating the display module depicted in FIG. 1 along a section line A-A'.

FIG. 3A is a cross-sectional diagram illustrating the display module depicted in FIG. 1 along a section line A-A'. Referring to FIG. 1, FIG. 2 and FIG. 3A, in the present embodiment, the sidewall 130b of the support carrier 130 includes two inner surfaces s facing an optical axis X and opposite to each other. Therein, an inner surface s1 is adjacent to a first light emitting unit row R1 and farther away form a second light emitting unit row R2. The inner surface s1 is located between the display panel 120 and a second surface P2. Another inner surface s2 is adjacent to the second light emitting unit row R2 and farther away form the first light emitting unit row R1. The inner surface s2 is located between the display panel 120 and the second surface P2. In the present embodiment, the inner surfaces s1 and s2 may both be a plane inclined facing to the optical axis X of the light emitting unit 110. In one embodiment, the inclined levels of inner surfaces s1 and s2 are different from each other. More specifically, an acute angle α included between the inner surface s1 and a reference plane T may be smaller than an acute angle β included between the inner surface s2 and the reference plane T. However, the invention is not limited thereto. Forms of the inner surfaces s may be adjusted based on actual requirements. Hereinafter, examples are described with reference to FIG. 3B and FIG. 3C.

Figure 3B:
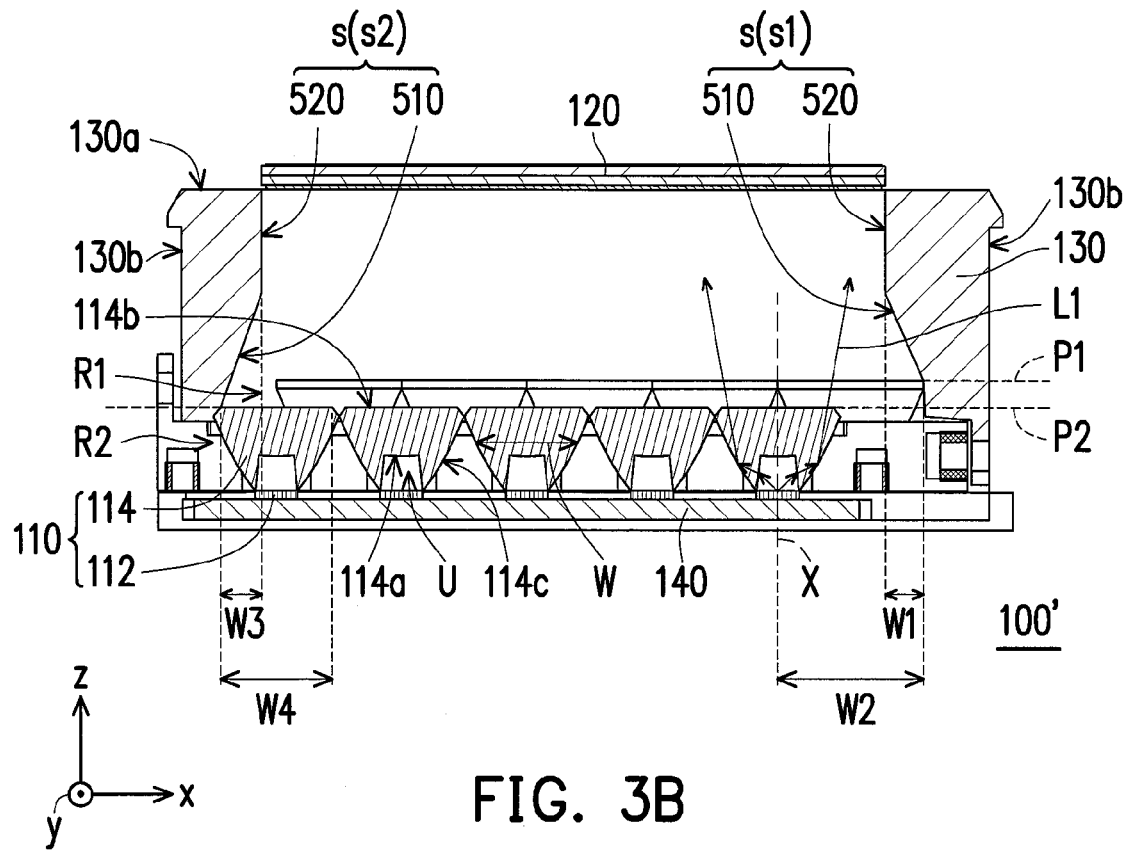
FIG. 3B is a cross-sectional diagram of a display module according to another embodiment of the invention.

FIG. 3B is a cross-sectional diagram of a display module according to another embodiment of the invention. Referring to FIG. 3B, a display module 100' of FIG. 3B is similar to the display module 100 of FIG. 3A, thus identical or corresponding elements are indicated by the same or corresponding reference numbers. In the display module 100', the inner surfaces s comprises a plurality of surfaces respectively having different slopes instead of one single plane having a single slope. More specifically, each of the inner surfaces s includes a sub surface 510, and another sub surface 520 connecting the display panel 120 and the sub surface 510. The sub surface 520 is a plane perpendicular to the display panel 120, and the sub surface 510 is a plane inclined facing the optical axis X. Furthermore, an orthogonal projection of the sub surface 510 of the inner surface s1 on a first surface P1 includes a width W1 in an arranging direction of the light emitting units 110 of the first light emitting unit row R1 (e.g., a direction parallel to a direction x), and the light converging element 114 of each of the light emitting units 110 of the first light emitting unit row R1 includes a width W2 in the arranging direction of the light emitting units 110 of the first light emitting unit row R1 (e.g., the direction parallel to the direction x), wherein W1 is less than [(W2)/3] or W1 is less than [(W2)/4]; an orthogonal projection of the sub surface 510 of the inner surface s2 on the second surface P2 includes a width W3 in an arranging direction of the light emitting units 110 of the second light emitting unit row R2 (e.g., another direction parallel to the direction x), and the light converging element 114 of each of the light emitting units 110 of the second light emitting unit row R2 includes a width W4 in the arranging direction of the light emitting units 110 of the second light emitting unit row R2 (e.g., the another direction parallel to the direction x), wherein W3 is less than [(W4)/3] or W3 is less than [(W4)/4]. As another variation, the sub surface 520 is also an inclined plane that is inclined, rather than perpendicular, to the display panel 120. In case the sub surface 520 is the inclined plane, it is required that a gradient of the sub surface 520 to be less than a gradient of the sub surface 510, so as to facilitate the display module for providing uniform brightness.

Figure 3C:
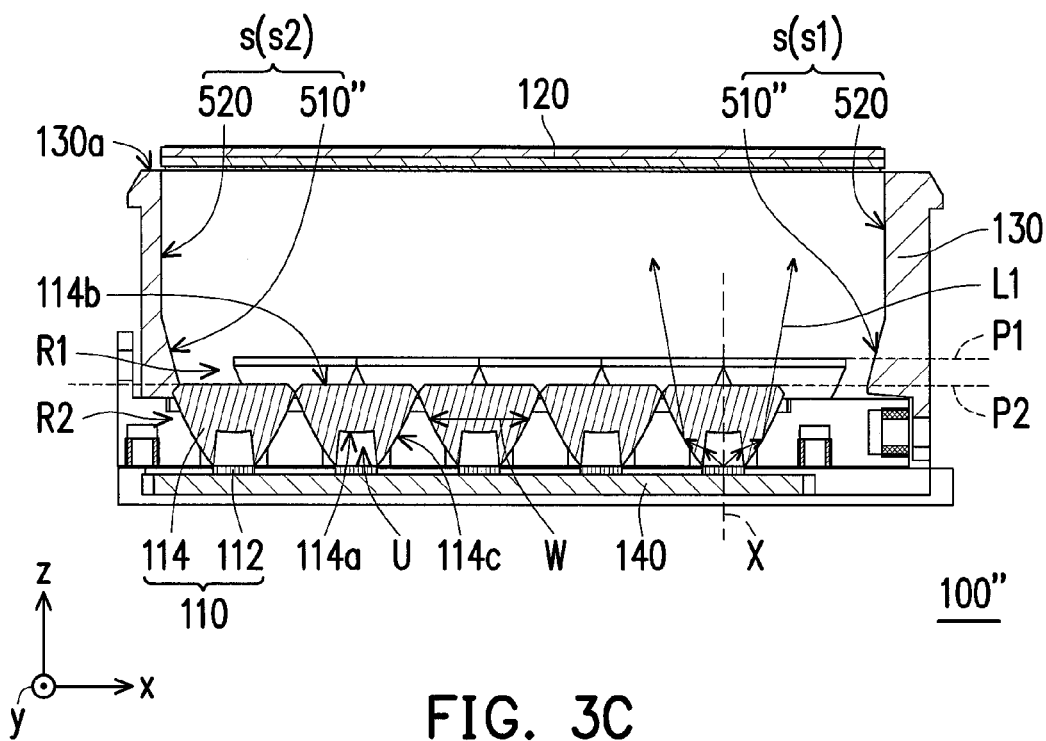
FIG. 3C is a cross-sectional diagram of a display module according to yet another embodiment of the invention.

FIG. 3C is a cross-sectional diagram of a display module according to yet another embodiment of the invention. Referring to FIG. 3C, a display module 100" of FIG. 3C is similar to the display module 100' of FIG. 3B, thus identical or corresponding elements are indicated by the same or corresponding reference numbers. Unlike the sub surface 510 which is inclined towards a direction approaching the optical axis X (the direction is from the inner surface s to the sidewall 130b), a sub surface 510", the display module 100' may be inclined towards a direction far away from the optical axis X (the direction is from the sidewall 130b to the inner surface S). As another variation, the sub surface 520 is also an inclined plane that is inclined, rather than perpendicular, to the display panel 120. In case the sub surface 520 is the inclined plane, it is required that a gradient of the sub surface 520 to be less than a gradient of the sub surface 510", so as to facilitate the display module for providing uniform brightness. In FIG. 3A to FIG. 3C, all of the inner surfaces s are capable of adjusting a light pattern and a uniformity of light-emitting surface collectively projected by the light emitting units 110 on the display panel 120, so that the light pattern may be more close to a shape and a size of a display area of the display panel 120, so as to further improve a light usability efficiency of the display module.

Referring back to FIG. 2 and FIG. 3A, each of the light emitting units 110 includes a light source 112 suitable for emitting the illuminating beam L1, and the light converging element 114 disposed in the transmitting path of the illuminating beam L1. In the present embodiment, each of the light converging elements 114 is solid, and covers the corresponding light source 112, but the invention is not limited thereto. In other embodiments, the light converging element 114 is also other appropriate implementations. Each of the light converging elements 114 includes a bottom surface 114a adjacent to the light source 112, a top surface 114b far away from the light source 112 and opposite to the bottom surface 114a, and a peripheral surface 114c connecting the bottom surface 114a and the top surface 114b. The top surface 114b is located between the display panel 120 and the bottom surface 114a. In the present embodiment, the bottom surface 114a includes a recess U. The light source 112 is disposed corresponding to the recess U, and a shape of the recess U may have different designs based different light sources. For instance, the recess U is formed a U shape or a V shape. The peripheral surface 114c may be a ring surface, and an inner diameter W of the ring surface may be gradually increased from the bottom surface 114a to the top surface 114b. In the present embodiment, the peripheral surface 114c is a curved surface protruded towards a direction far away from the optical axis X. However, the invention is not limited thereto. In other embodiments, the peripheral surface 114c is a curved surface recessed towards to the optical axis X, or a plane inclined towards a direction far away from the optical axis X. The illuminating beam L1 emitted by the light emitting unit 110 is reflected or refracted by the peripheral surface 114c, so as be converged for transmitting along a direction having a smaller included angle with the optical axis X of the light source 112. Accordingly, the display module 100 is capable of providing characteristics of high brightness and narrow angle of view.

In other embodiments, the light converging element 114 is, for example, a second lens. The second lens adjust a distribution of the illuminating beam L1 emitted by the corresponding light source 112. For instance, in the present embodiment, the second lens is capable of focusing a distribution range of the illuminating beam L1 emitted by each of the light emitting units 110 to the optical axis X of the light source 112. More specifically, an operation mechanism of the second lens is described as follows. First, the bottom surface 114a of the second lens refract the illuminating beam L1 originally having a greater included angle with the optical axis X, so that the illuminating beam L1 is incident to the peripheral surface 114c with a proper incident angle. Then, the peripheral surface 114c inclined towards the direction far away from the optical axis X may reflect or refract said illuminating beam L1, so that the illuminating beam L1 is transmitted towards the direction having the smaller included angle with the optical axis X, thereby achieving the purpose of converging the illuminating beam L1. It should be noted that, the light converging element of the invention is not limited only to be the second lens. In other embodiments, the light converging element 114 is also other optical elements in appropriate forms. It falls in the protection scope of the light converging element defined by the invention as long as the optical elements are capable of changing the transmitting path of the illuminating beam L1 and focusing the distribution range of the illuminating beam L1 to the optical axis X of the light source 112.

As shown in FIG. 2, the light emitting units 110 are divided into at least one first light emitting unit row R1 and a second light emitting unit row R2 adjacent to the first light emitting unit row R1. The light converging elements 114 of the first light emitting unit row R1 are aligned in a first row direction d1. The light converging elements 114 of the second light emitting unit row R2 are aligned in a second row direction d2. The second row direction d2 is parallel to the first row direction d1 without coinciding to each other. In the present embodiment, the light emitting units 110 are divided into two first light emitting unit rows R1 and one second light emitting unit row R2 sandwiched between the two first light emitting unit rows R1. However, a number of first light emitting unit rows and a number of the second light emitting unit rows in the invention are not limited to those illustrated in FIG. 2. A number of first light emitting unit rows R1 and a number of the second light emitting unit rows R2 are decided based on actual requirements. For instance, in other embodiments, if a light emitting area of one single first light emitting unit row R1 and a light emitting area of one single second light emitting unit row R2 are far smaller than an area of the display area of the display panel 120, the first light emitting unit rows R1 and the second light emitting unit row R2 is disposed and alternately arranged along a column direction d3. In other words, the first light emitting unit row R1 and the second light emitting unit row R2 are alternately arranged, so that two adjacent light sources 112 of the first light emitting unit row R1 and their adjacent light source 112 of the second light emitting unit row R2 form an isosceles triangle, thereby meeting a backlight demand for the display panel 120. Moreover, the arrangement of the first light emitting unit rows R1 and the second light emitting unit row R2 is not limited to FIG. 2. In other embodiment, a first light emitting unit row R1, a first light emitting unit row R1, a second light emitting unit row R2, a first light emitting unit row R1, a first light emitting unit row R1 are disposed in sequence.

In the present embodiment, manufacturers utilize one mold to form the light converging elements 114 of the first light emitting unit row R1 at the same time, and the formed light converging elements 114 of the first light emitting unit row R1 may be in form of sheets. Then, the manufacturers utilize said mold to form the light converging elements 114 of the second light emitting unit row R2 at another point in time. Thereafter, the light converging elements 114 of the first light emitting unit row R1 and the light converging elements 114 of the second light emitting unit row R2 may then be assembled into the display module 100. However, the invention is not limited thereto. In other embodiments, the manufacturers also utilize one mold to form all of the light converging elements 114 for the display module 100 at the same time, and assemble all of the light converging elements 114 into the display module 100.

Figure 4:
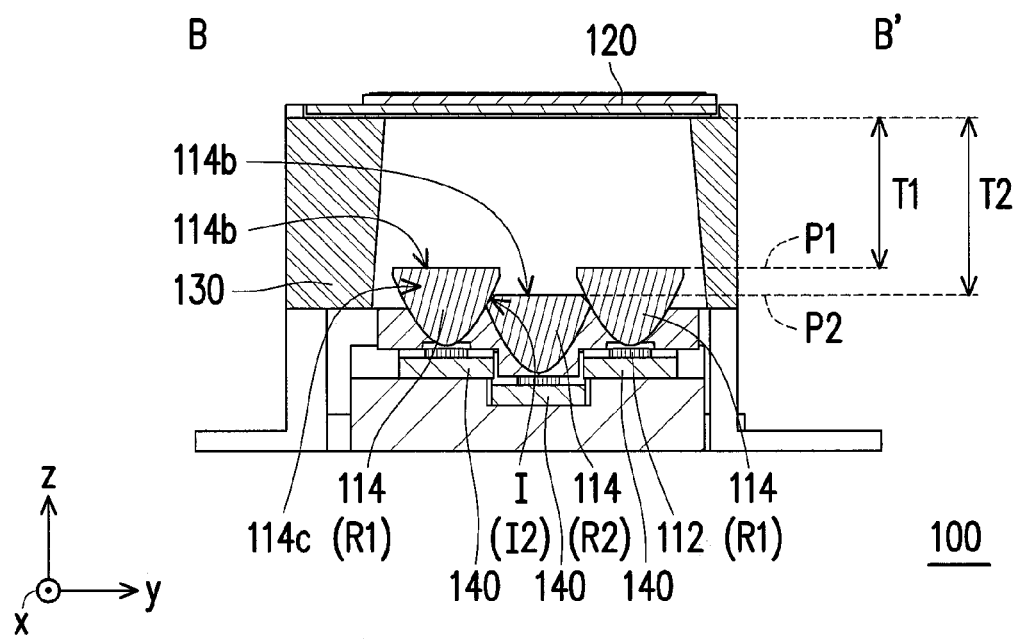
FIG. 4 is a cross-sectional diagram illustrating the display module depicted in FIG. 1 along a section line B-B'.

FIG. 4A is a cross-sectional diagram illustrating the display module depicted in FIG. 1 along a section line B-B'. Referring to FIG. 2 and FIG. 4, in the present embodiment, an intersection I between the top surface 114b and the peripheral surface 114c of each of the light converging elements 114 is circular. In the present embodiment, an intersection angle between the top surface 114b and the peripheral surface 114c include a lead angle design, so as to prevent an interference caused by structure of the light converging element 114. As shown in FIG. 2, one of the light converging elements 114 of the second light emitting unit row R2 is disposed between each adjacent two of the light converging elements 114 of the first light emitting unit row R1. One of the light converging elements 114 of the first light emitting unit row R1 is disposed between each adjacent two of the light converging elements 114 of the second light emitting unit row R2. In other words, the light converging elements 114 of the display module 100 are disposed in a manner of having highest number density per unit area. However, it should be noted that, a shape of the intersection I between the top surface 114b and the peripheral surface 114c, as well as a disposition relation between the light converging elements 114 of the first light emitting unit row R1 and the light converging elements 114 of the second light emitting unit row R2, are not limited to the above. In other embodiment, the intersection I is also other appropriate shapes, and the disposition relation between the light converging elements 114 of the first light emitting unit row R1 and the light converging elements 114 of the second light emitting unit row R2 is also designed under a principle of "having highest number density per unit area" with reference to the shape of the intersection I. More embodiments are provided below as examples for further description regarding above.

Referring to FIG. 2 and FIG. 4, the top surfaces 114b of the light converging elements 114 of the first light emitting unit row R1 are disposed on the same first surface P1. The top surfaces 114b of the light converging elements 114 of the second light emitting unit row R2 are disposed on the same second surface P2 which is different from the first surface P1. The first surface P1 is located between the display panel 120 and the second surface P2. An intersection I2 between the top surface 114b and the peripheral surface 114c of each of the light converging elements 114 of the second light emitting unit row R2 is in contact with the peripheral surface 114c of at least one light converging element 114 of the first light emitting unit row R1. In other words, the light converging elements 114 of the first light emitting unit row R1 and the light converging elements 114 of the second light emitting unit row R2 are not coplanar. A shortest distance T2 from each of the light converging elements 114 of the second light emitting unit row R2 to the display panel 120 is greater than a shortest distance T1 from one of the light converging elements 114 of the contacted first light emitting unit row R1 to the display panel 120.

In the present embodiment, the first surface P1 and the second surface P2 are both a plane. The first surface P1 and the second surface P2 are parallel to the display panel 120. However, the invention is not limited thereto. In other embodiments, the first surface P1 and second surface P2 are not necessarily to be the plane, and the first surface P1 and the second surface P2 are not necessarily to be parallel to the display panel 120. More embodiments are provided below as examples for further description regarding above.

It should be noted that, by using design of having the light converging elements 114 of the first light emitting unit row R1 spaced apart from the light converging elements 114 of the second light emitting unit row R2 in up and down manner, the light converging elements 114 of the first light emitting unit row R1 and the light converging elements 114 of the second light emitting unit row R1 may be stacked more closely, such that an overlapping area of two light spots formed by the two on the display panel 120 is increased. Accordingly, brightness at the region where the first light emitting unit row R1 is intersected with the second light emitting unit row R2 in the display panel 120 is increased, so as to solve the problem of non-uniform display in conventional art.

Figure 5:
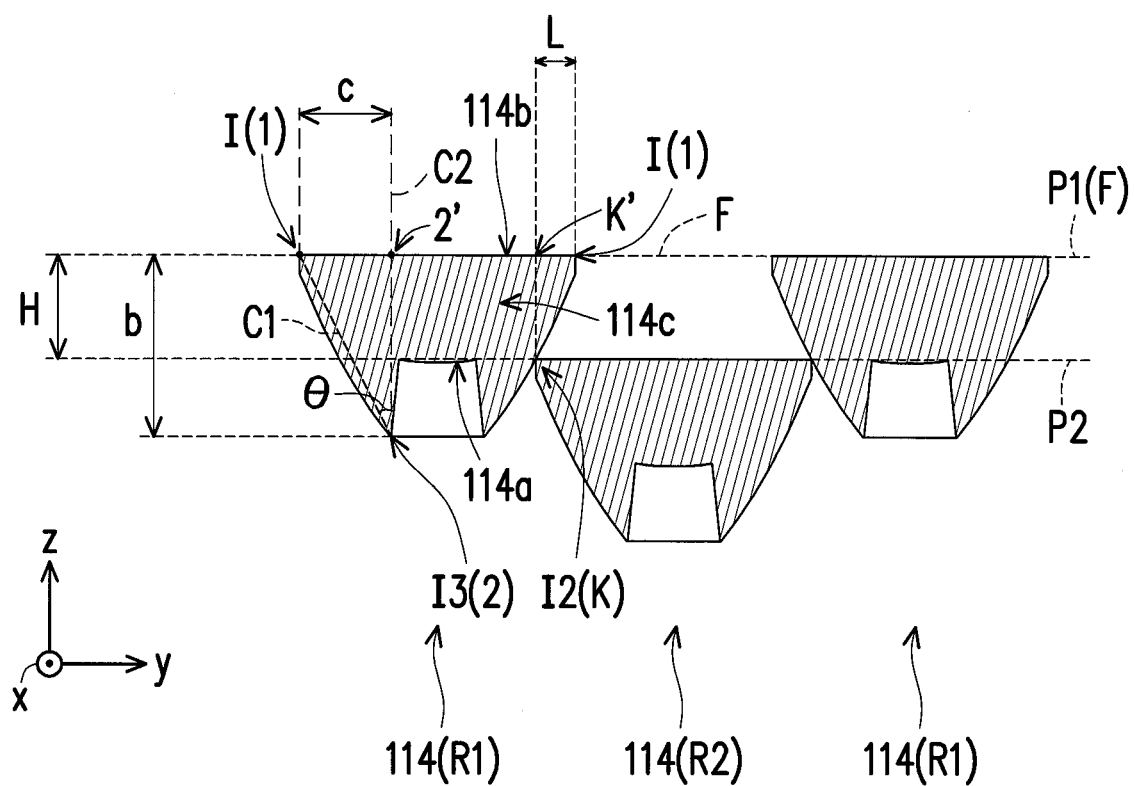
FIG. 5 is an enlarged view of the light converging element depicted in FIG. 4.

FIG. 5 is an enlarged view of the light converging element depicted in FIG. 4. Referring to and FIG. 5, in the present embodiment, an intersection I between the peripheral surface 114c and the top surface 114b of each of the light converging elements 114 is cut by a reference plane (e.g., a paper surface of FIG. 5) perpendicular to the top surface 114b to form a first cutoff point 1. An intersection I3 between the peripheral surface 114c and the bottom surface 114a of each of the light converging elements 114 is cut by the reference plane (e.g., a paper surface of FIG. 5) to form a second cutoff point 2. The first cutoff point 1 and the second cutoff point 2 are linked to form a straight line C1. An angle $\theta$ is included between the straight line C1 and a reference line C2 perpendicular to the top surface 114b. A shortest distance from an orthogonal projection 2' of the second cutoff point 2 on a plane F where the top surface 114b is located, to the first cutoff point 1 is defined as c. A maximum height of the light converging element 114 of each of the light emitting units 110 in a direction z perpendicular to the top surface 114b is defined as b. A contact point k is provided between the intersection I2 between the top surface 114b and the peripheral surface 114c of each of the light converging elements 114 of the second light emitting unit row R2, and the peripheral surface 114c of one of the light converging elements 114 of the first light emitting unit row R1. A shortest distance from an orthogonal projection K' of the contact point K on the first surface P1, to an intersection I between the top surface 114b and the peripheral surface 114c of the light converging element 114 of the first light emitting unit row R1 is defined as L. A shortest distance between the first surface P1 and the second surface P2 is defined as H. In case $\theta$, c, L, H satisfies conditions of $L \le c-(b-H) \times \tan\theta$ and $H < b$, the illuminating beams emitted from the second light emitting unit row R2 are not seriously block by the adjacent first light emitting unit row R1, so that the display module 100 improves the light usability efficiency of the light emitting units while solving the problem of poor display in conventional art.

Referring back to FIG. 3A and FIG. 4, the display module 100 may optionally include a driving unit 140. The driving unit 140 is electrically connected to the light source 112 of each of the light emitting units 110. In case a number of the light emitting units 110 of the first light emitting unit row R1 is equal to a number of the light emitting units 110 of the second light emitting unit row R2, the driving unit 140 is capable of making a luminous flux total of the light sources 112 of the first light emitting unit row R1 to be less than a luminous flux total of the light sources 112 of the second light emitting unit row R2, wherein the luminous flux refers to an optical energy emitted by the light source per unit time. For instance, in case the light source 112 is a current driving element (e.g., a light emitting diode), the driving unit 140 is capable of providing a plurality of first currents to the light sources 112 of the first light emitting unit row R1, and providing a plurality of second currents to the light sources 112 of the second light emitting unit row R2, wherein a total of the first currents is less than a total of the second currents. In case the total of the first currents is less than the total of the second currents, the luminous flux total of the light sources 112 of the first light emitting unit row R1 may be less than the luminous flux total of the light sources 112 of the second light emitting unit row R2, and an average distance from the light sources 112 of the first light emitting unit row R1 to the display panel 120 is less than an average distance from the light sources 112 of the second light emitting unit row R2 to the display panel 120. Therefore, a backlight brightness at an overlap region of the display panel 120 and the first light emitting unit row R1 and a backlight brightness at an overlap region of the display panel 120 and the second light emitting unit row R2 is adjusted to be close to each other, so that the display module 100 provides a more preferable displaying effect.

In the present embodiment, each of the light sources 112 of the first light emitting unit row R1 have an equal distance to the display panel 120, thus the driving unit 140 choose to provide the same first currents (e.g., 18 milli-amperes) to the light sources 112 of the first light emitting unit row R1, respectively. Each of the light sources 112 of the second light emitting unit row R2 have an equal distance to the display panel 120, thus the driving unit 140 choose to provide the same second currents (e.g., 20 milli-amperes) to the light sources 112 of the second light emitting unit row R2, respectively. However, the invention is not limited thereto. In other embodiment, it is not necessarily for each of the light sources 112 of the first light emitting unit row R1 (or the second light emitting unit row R2) to have the equal distance to the display panel 120, and it is not necessarily for said currents provided by driving unit 140 to the light sources 112 of the first light emitting unit row R1 (or the second light emitting unit row R2) to have the same intensity. More specifically, if each of the light sources 112 of the first light emitting unit row R1 (or the second light emitting unit row R2) has the distance to the display panel 120 being different to one another, the driving unit 140 may provide currents with proper intensity to each of the light sources 112 of the first light emitting unit row R1 (or the second light emitting unit row R2) based on a principle of "providing a greater current to the light source 112 if the distance between the light source 112 and the display panel 120 is greater".

It should be noted that, the invention is not intended to limit that the driving unit 140 must achieve that "the light flux total of the light source of the first light emitting unit row is less than the light flux total of the light sources of the second light emitting unit row". The driving unit 140 achieving that "the light flux total of the light source of the first light emitting unit row is less than the light flux total of the light sources of the second light emitting unit row" refers to when the number of the light emitting units 110 of the first light emitting unit row R1 is equal to the number of the light emitting units 110 of the second light emitting unit row R2.

More generally (i.e., regardless of whether the number of the light emitting units 110 of the first light emitting unit row R1 is equal or not equal to the number of the light emitting units 110 of the second light emitting unit row R2), the driving unit 140 provides a third current to one of the light sources 112 of the first light emitting unit row R1, and provides a fourth current to one of the light sources 112 of the second light emitting unit row R2. The light emitting unit 110 in which the light source 112 receives the third current is in contact with the light emitting unit 112 in which the light source 112 receives the fourth current. A distance between the light emitting unit 110 receiving the third current and the display panel 120 is less than a distance between the light emitting unit 110 receiving the fourth current and the display panel 120. The driving unit 140 makes the third current to be less than the fourth current. Accordingly, the backlight brightness at an overlap region of the display panel 120 and the first light emitting unit row R1 and the backlight brightness at an overlap region of the display panel 120 and the second light emitting unit row R2 are adjusted to be close to each other, so that the displaying effect of the display module 100 is better.

Figure 6:
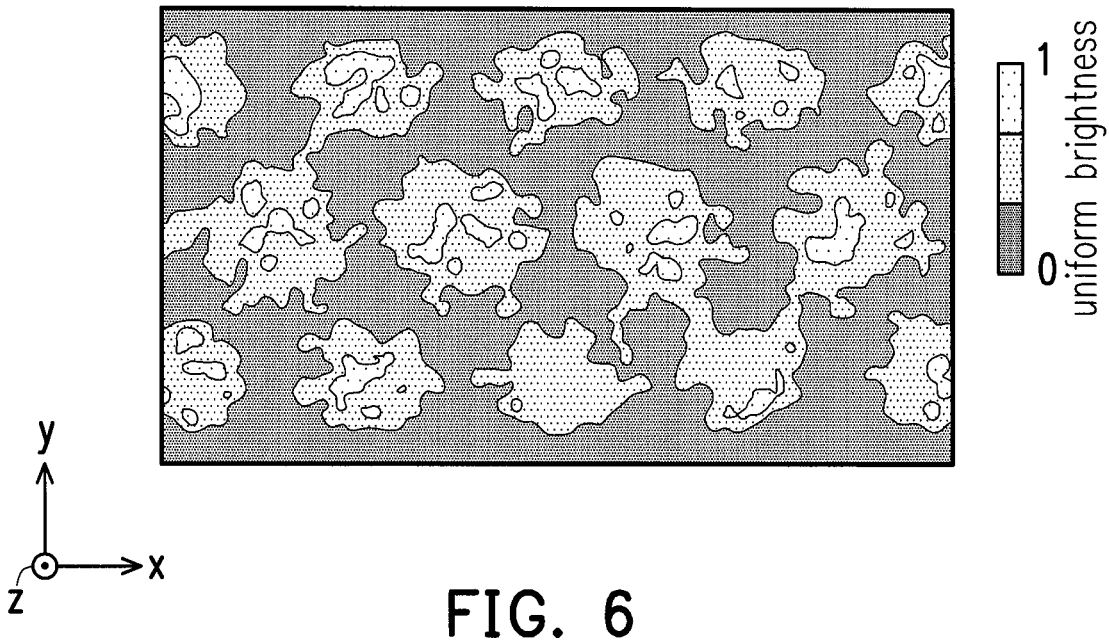
FIG. 6 illustrates a brightness distribution of a display module according to a comparison example.
Figure 7:
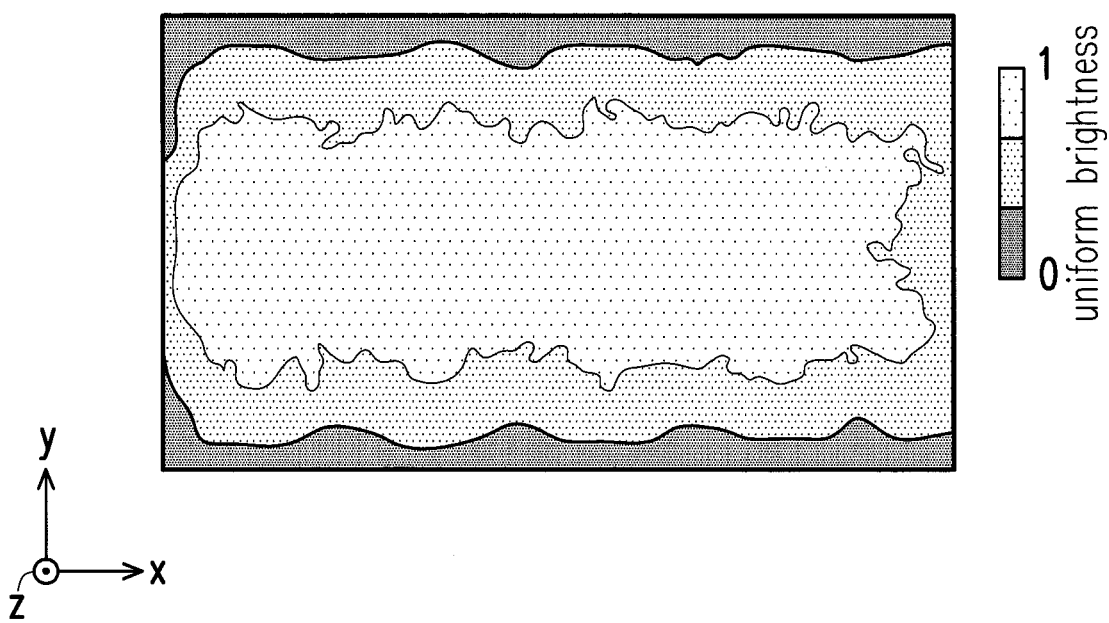
FIG. 7 illustrates a brightness distribution of the display module depicted in FIG. 1.

FIG. 6 illustrates a brightness distribution of a display module according to a comparison example. FIG. 7 illustrates a brightness distribution of the display module depicted in FIG. 1. A major difference between a display module of the comparison example and the display module 100 of FIG. 1 is described as follows. In the display module 100, the light converging elements 114 of the first light emitting unit row R1 are spaced apart from the light converging elements 114 of the second light emitting unit row R2 in up and down manner. Namely, the light converging elements 114 of the first light emitting unit row R1 and the light converging elements 114 of the second light emitting unit row R2 are disposed on different planes in a crisscross manner. In the display module of the comparison example, all of the light converging elements 114 are disposed on the same plane. In view of FIG. 6 and FIG. 7, it can be known that, technical means of "a surface where the top surface of the light converging element of the first light emitting unit row is located is disposed between the display panel and a surface where the top surface of the light converging element of the second light emitting unit row is located" and "the intersection between the top surface and the peripheral surface of each of the light converging elements of the second light emitting unit row is in contact with the peripheral surface of at least one light converging element of the first light converging element" is utilized by the display module 100 according to an embodiment of the invention in order to achieve the effect of improving a uniform backlight of the display panel, such that the displaying effect of the display module 100 is better. More specifically, both uniformity and displaying effect are optimized by disposing and densely stacking the light converging elements 114 on horizontal plane and vertical plane.

Figure 8:
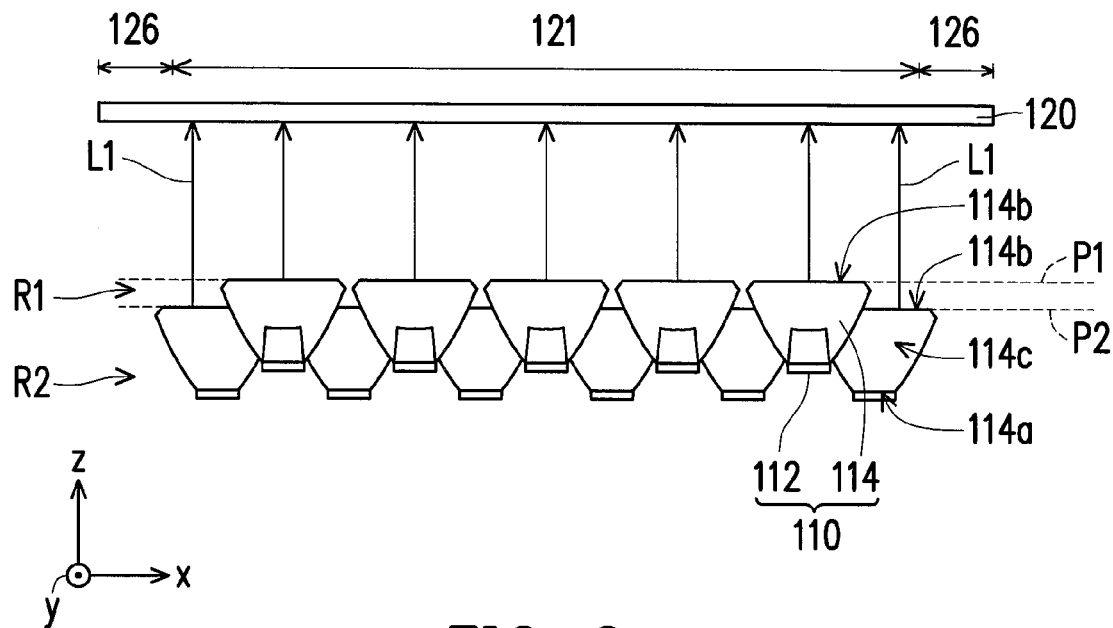
FIG. 8 is a cross-sectional diagram of the display panel and the light emitting unit depicted in FIG. 1.
Figure 9:
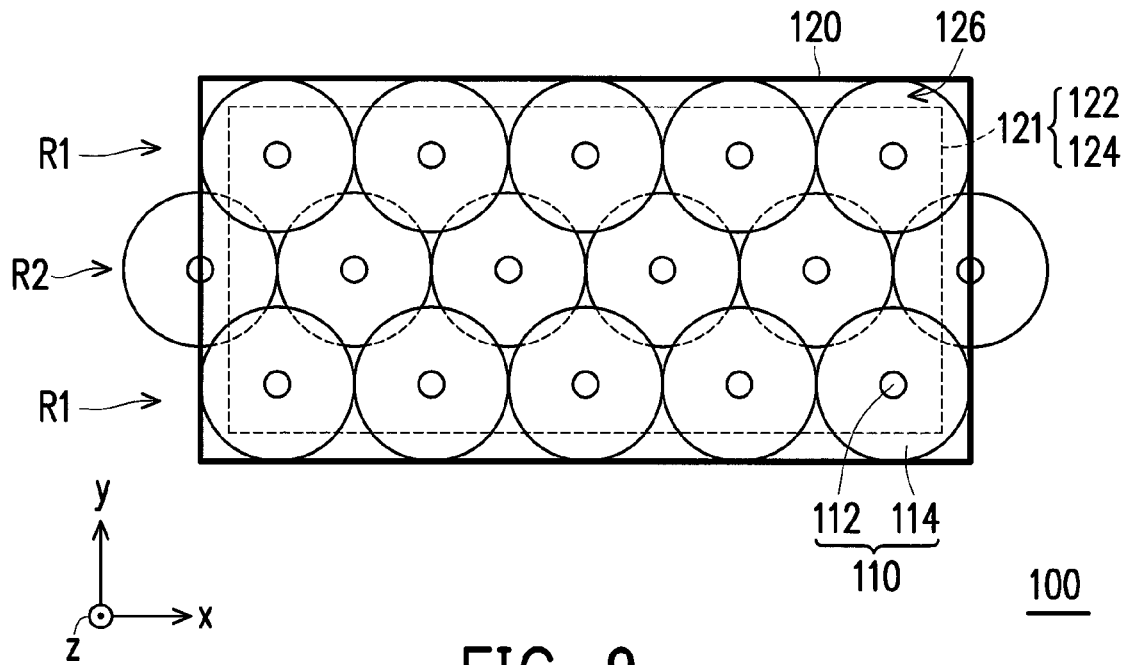
FIG. 9 is a top view of the display panel and the light emitting unit depicted in FIG. 1.

FIG. 8 is a cross-sectional diagram of the display panel and the light emitting unit depicted in FIG. 1. FIG. 9 is a top view of the display panel and the light emitting unit depicted in FIG. 1. In view of FIG. 8 and FIG. 9, it can be known that in the present embodiment, the illuminating beams L1 emitted by outermost two of the light emitting units 110 of the second light emitting unit row R2 is not completed projected on a display area 121 of the display panel 120. Instead, the illuminating beams L1 is absorbed by a light blocking layer (e.g., a Black matrix (BM)) of a non-display area, and converted into heat thereby influencing overall light usability efficiency and heat dissipation efficiency of the display module 100. In order to solve above-said problem, a display module according to another embodiment is further provided below with reference to FIG. 10 to FIG. 13.

Figure 10:
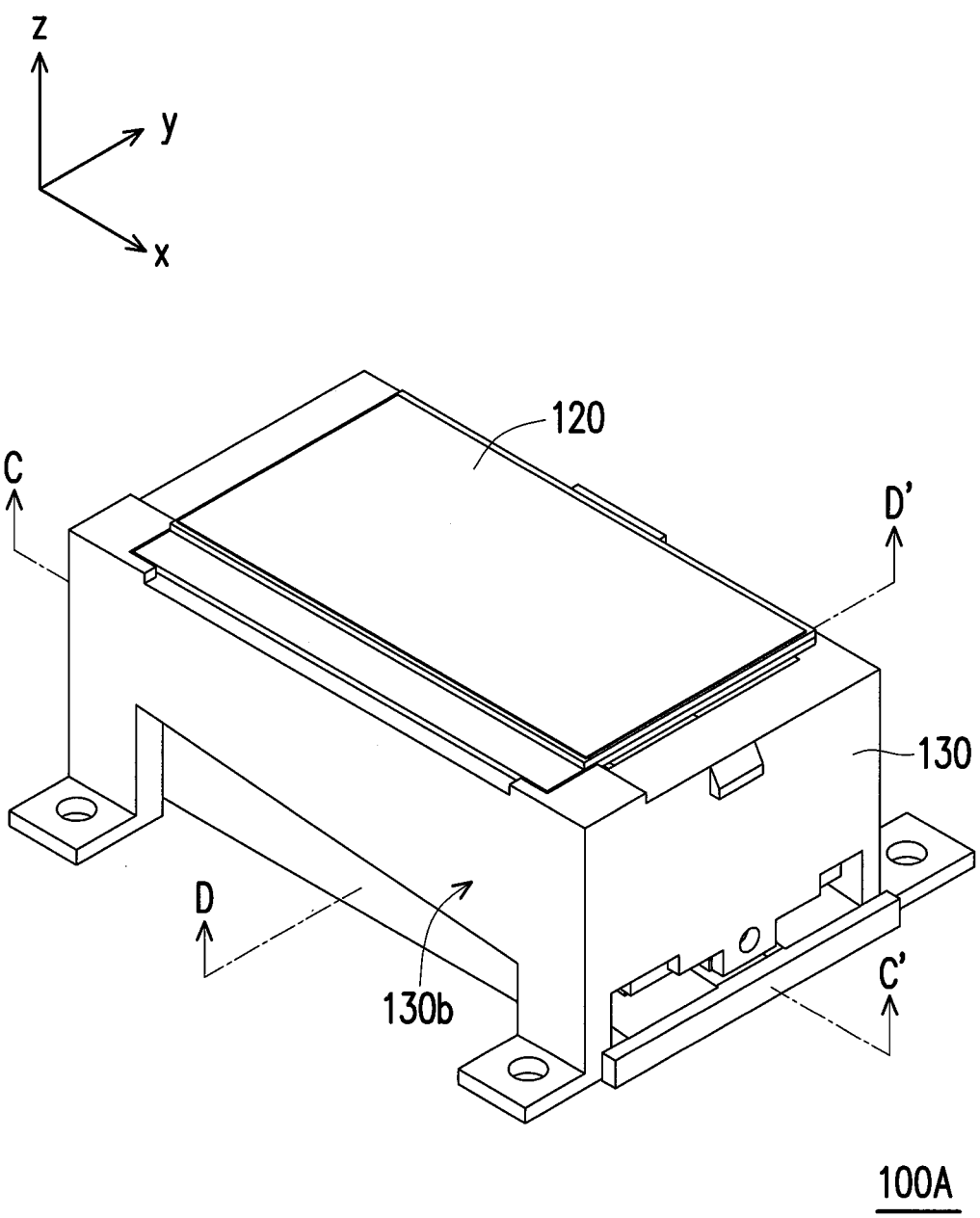
FIG. 10 is a three-dimensional diagram of a display module according to another embodiment of the invention.
Figure 11:
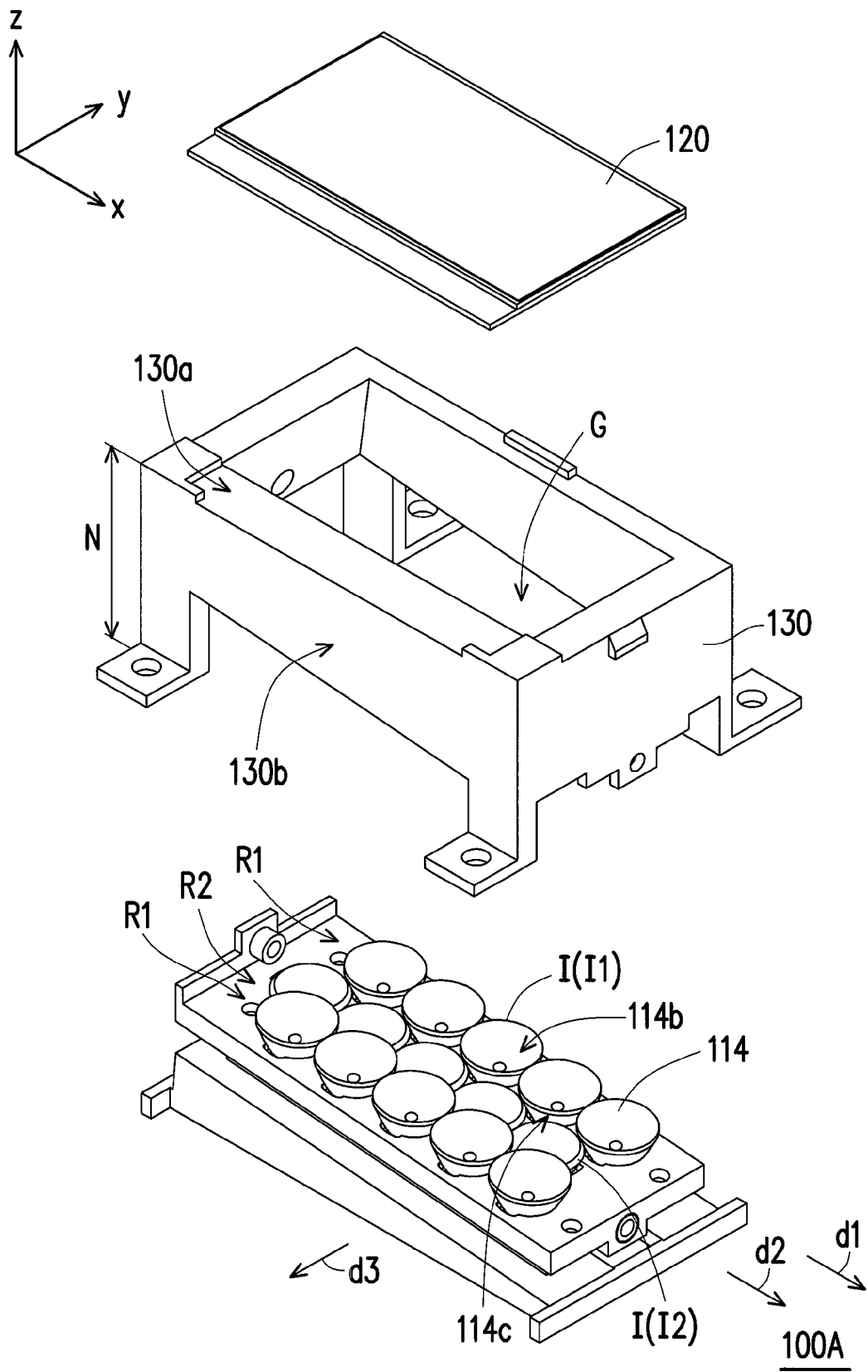
FIG. 11 is an explosion diagram of the display module depicted in FIG. 10.
Figure 12:
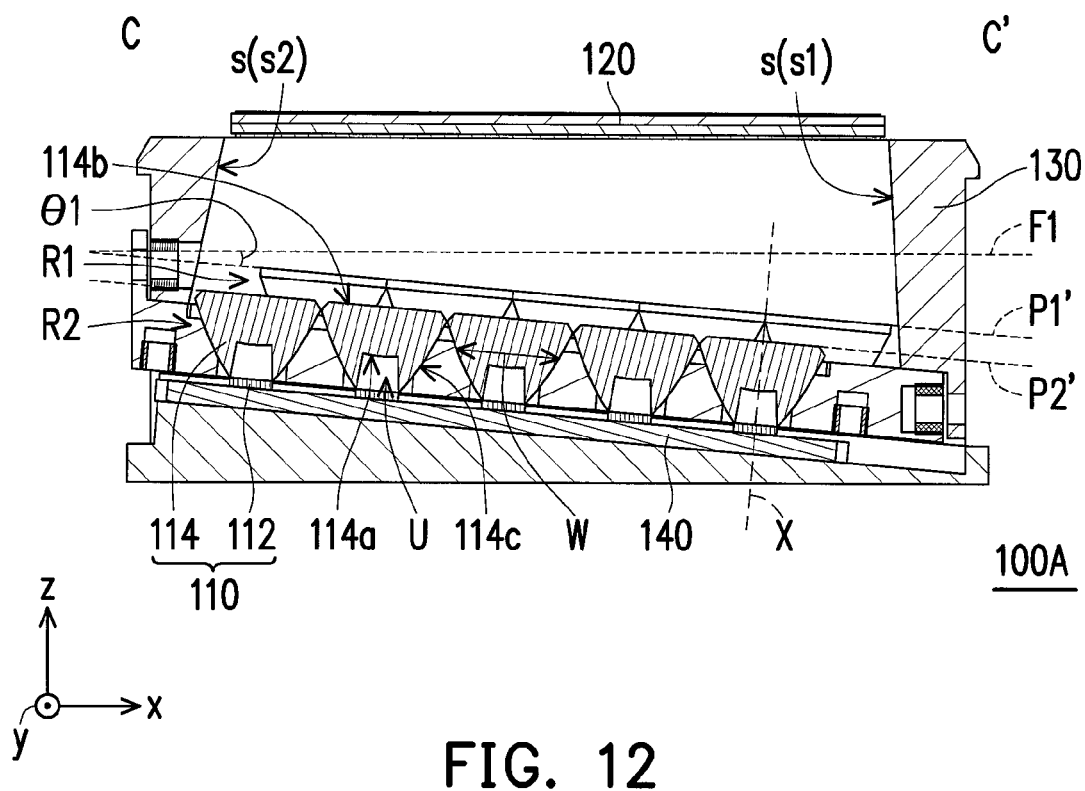
FIG. 12 is a cross-sectional diagram illustrating the display module depicted in FIG. 10 along a section line C-C'.
Figure 13:
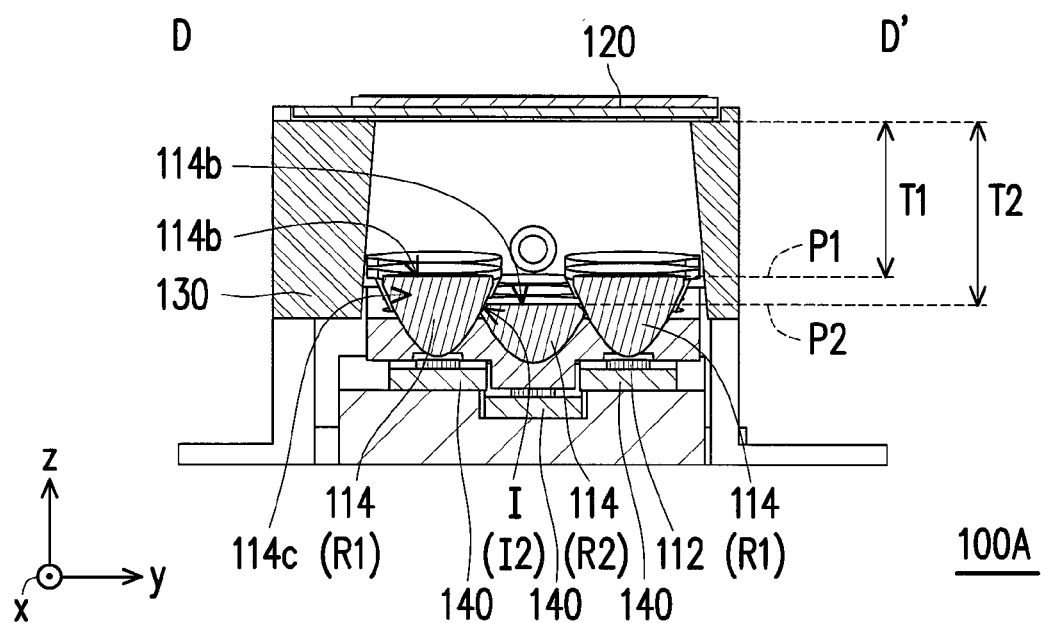
FIG. 13 is a cross-sectional diagram illustrating the display module depicted in FIG. 10 along a section line D-D'.

FIG. 10 is a three-dimensional diagram of a display module according to another embodiment of the invention. FIG. 11 is an explosion diagram of the display module depicted in FIG. 10. FIG. 12 is a cross-sectional diagram illustrating the display module depicted in FIG. 10 along a section line C-C'. FIG. 13 is a cross-sectional diagram illustrating the display module depicted in FIG. 10 along a section line D-D'. Referring to FIG. 10, FIG. 11, FIG. 12 and FIG. 13 together, a display module 100A is similar to the display module 100, thus identical or corresponding elements are indicated by the same or corresponding reference numbers. Differences between the two are provided as follows, and the identical parts of the two may refer to the foregoing embodiments according corresponding reference numbers, thus related description is omitted hereinafter.

Referring to FIG. 10, FIG. 11, FIG. 12 and FIG. 13, the light emitting units 110 of the display module 100A are also divided into at least one first light emitting unit row R1 and a second light emitting unit row R2 adjacent to the first light emitting unit row R1. The top surfaces 114b of the light converging elements 114 of the first light emitting unit row R1 are disposed on the same first surface P1' (marked in FIG. 12). The first surface P1' is a plane. The top surfaces 114b of the light converging elements 114 of the second light emitting unit row R2 are disposed on the same second surface P2' (marked in FIG. 12). The second surface P2' is also a plane and parallel to the first surface P1'. The first surface P1' is located between the display panel 120 and the second surface P2'. As shown in FIG. 11 and FIG. 13, an intersection I between the top surface 114b and the peripheral surface 114c of each of the light converging elements 114 of the second light emitting unit row R2 is in contact with the peripheral surface 114c of at least one light converging element 114 of the first light emitting unit row R1. Unlike the display module 100, in the display module 100A, the first surface P1' and the second surface P2' are not parallel to the display panel 120. Furthermore, it is more preferable that an acute angle θ1 included between the first surface P1' (or the second surface P2') and a reference plane F1 parallel to the display panel 120 is less than or equal to 10 degrees. A contrast ratio of an image provided by the display panel may be lowered if the acute angle θ1 is greater than 10 degree.

Figure 14:
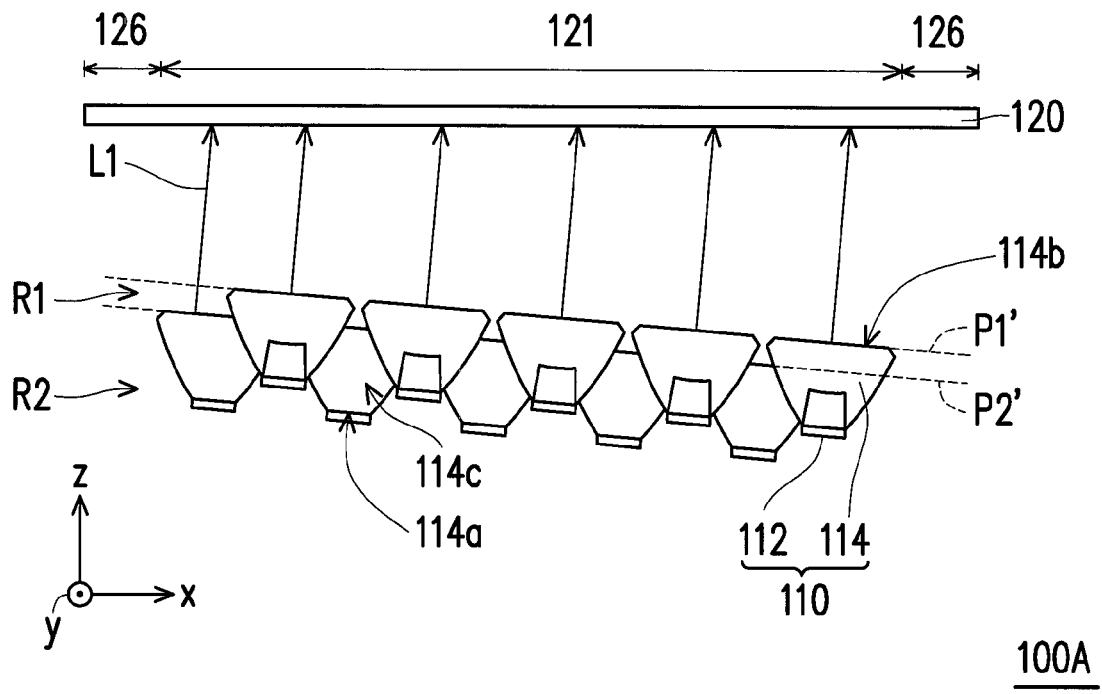
FIG. 14 is a cross-sectional diagram of the display panel and the light emitting unit depicted in FIG. 10.
Figure 15:
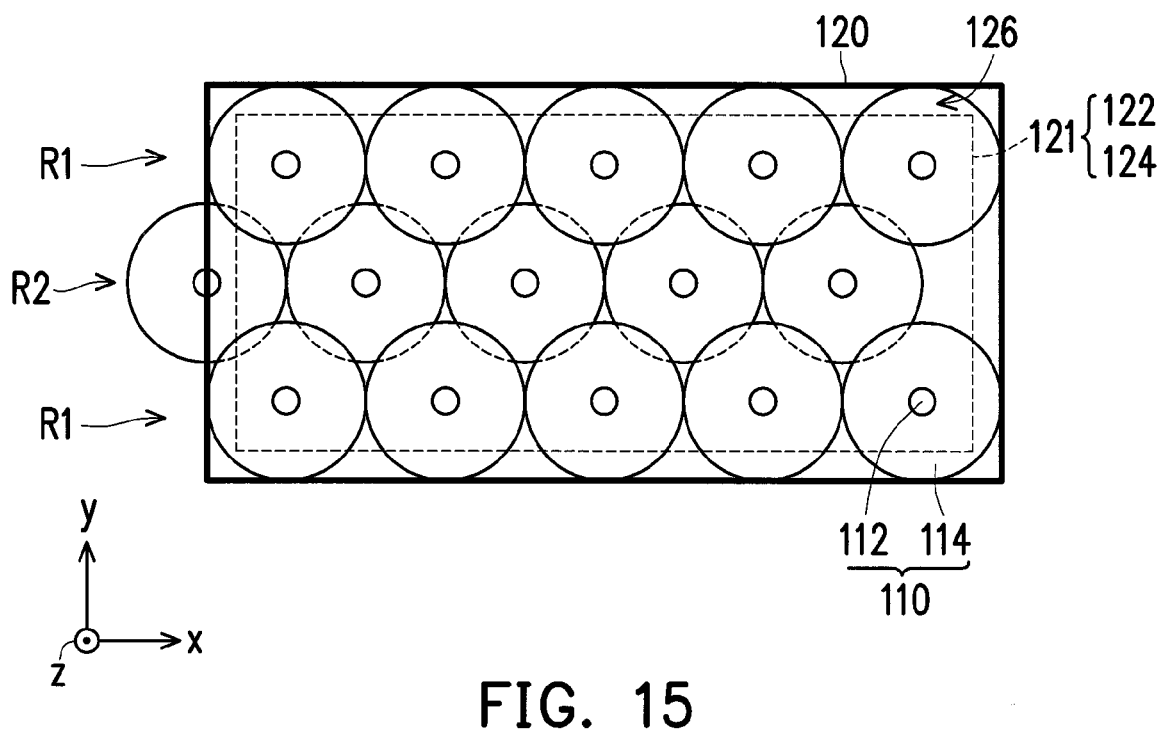
FIG. 15 is a top view of the display panel and the light emitting unit depicted in FIG. 10.

FIG. 14 is a cross-sectional diagram of the display panel and the light emitting unit depicted in FIG. 10. FIG. 15 is a top view of the display panel and the light emitting unit depicted in FIG. 10. In view of FIG. 14 and FIG. 15, it can be known that, when the first surface P1' and the second surface P2' are inclined relative to the display panel 120, a projection range of the illuminating beams L1 emitted by outermost two of the light emitting units 110 of the second light emitting unit row R2 falls within the display area 121 of the display panel 120. Also, the problem in which the illuminating beams L1 emitted by outermost two of the light emitting units 110 of the second light emitting unit row R2 are not completed projected on the display area 121 of the display panel 120 is solved, and an amount of the light emitting units 110 used are also reduced by one. In other words, with design of the display module 100A utilizing the top surface 114b of the light converging element 114 inclined to the display panel 120, the light usability efficiency of the display module 100A is further improved. In addition, in view of FIG. 9 and FIG. 15, it can be known that, as in comparison to the display module 100, by adopting the technical means of "the first surface P1' and the second surface P2' are not parallel to the display panel 120", the display module 100A reduce the amount of the outermost light emitting units 110 by one (e.g., rightmost) for the second light emitting unit row R2 while maintaining a favorable uniformity. In other words, the display module 100A is advantageous in providing high displaying quality while having lower costs.

Figure 16:
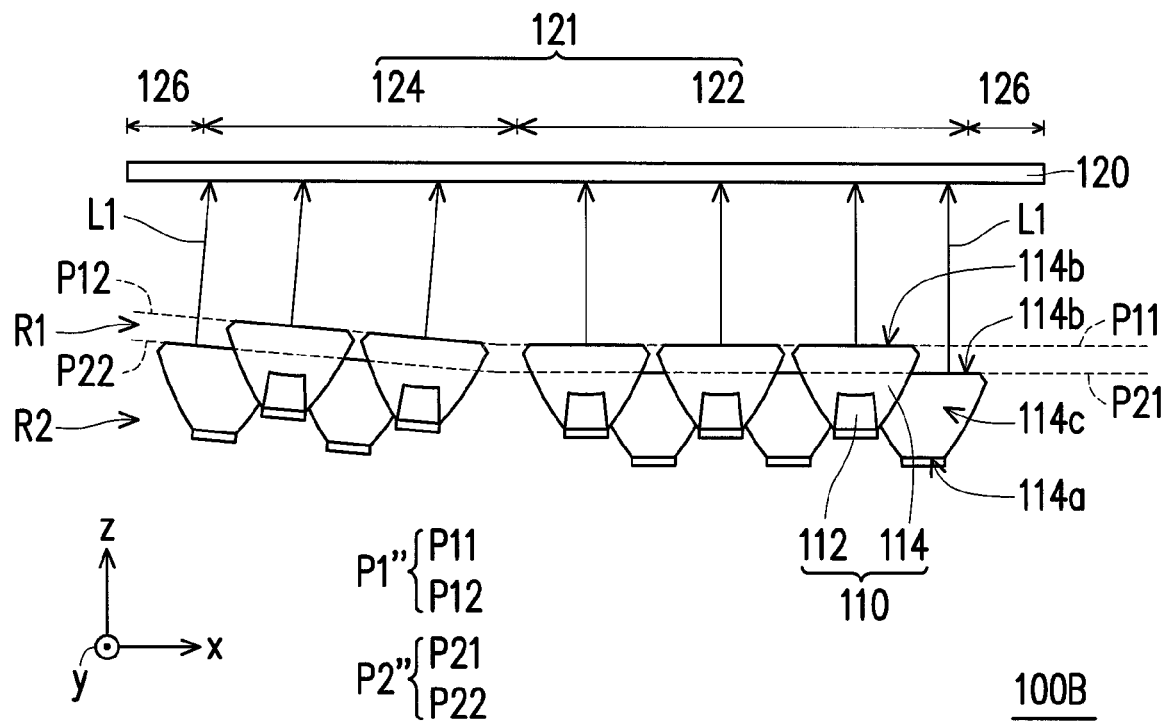
FIG. 16 is a three-dimensional diagram of a display module according to yet another embodiment of the invention.

FIG. 16 is a three-dimensional diagram of a display module according to yet another embodiment of the invention. Referring to FIG. 16, a display module 100B is similar to the display module 100, thus identical or corresponding elements are indicated by the same or corresponding reference numbers. Differences between the two are provided as follows, and the identical parts of the two may refer to the foregoing embodiments according corresponding reference numbers, thus related description is omitted hereinafter.

The light emitting units 110 of the display module 100B are also divided into at least one first light emitting unit row R1 and a second light emitting unit row R2 adjacent to the first light emitting unit row R1. The top surfaces 114b of the light converging elements 114 of the first light emitting unit row R1 are disposed on the same first surface P1". The top surfaces 114b of the light converging elements 114 of the second light emitting unit row R2 are disposed on the same second surface P2". The first surface P1" is located between the display panel 120 and the second surface P2". An intersection between the top surface 114b and the peripheral surface 114c of each of the light converging elements 114 of the second light emitting unit row R2 is in contact with the peripheral surface 114c of at least one light converging element 114 of the first light emitting unit row R1.

Unlike the display module 100, the first surface P1" and the second surface P2" are a curvy surface instead of a plane that is continuously flat. More specifically, the display panel 120 has an inner display area 122, an outer display area 124 surrounding the inner display area 122, and a non-display area 126 surrounding the outer display area 124. The first surface P1" includes a first sub surface P11 parallel to the display panel 120, and a second sub surface P12 connecting the first sub surface P11 and inclined towards the display panel 120. Each of the top surfaces 114b of a portion of the light converging elements 114 of the first light emitting unit row R1 is disposed on the first sub surface P11. Each of the top surface 114b of a remaining portion of the light converging elements 114 of the first light emitting unit row R1 is disposed on the second sub surface P12. The illuminating beams L1 passed through the first sub surface P11 at least passes through the inner display area 122 of the display panel 120 without passing through the non-display area 126 of the display panel 120. The illuminating beams L1 passed through the second sub surface P12 passes through the outer display area 124 of the display panel 120 without passing through the non-display area 126 of the display panel 120. The second surface P2" includes a third sub surface P21 parallel to the display panel 120, and a fourth sub surface P22 connecting the third sub surface P21 and inclined towards the display panel 120. The top surfaces 114b of a portion of the light converging elements 114 of the second light emitting unit row R2 are disposed on the third sub surface P21. The top surface 114b of a remaining portion of the light converging elements 114 of the second light emitting unit row R2 are disposed on the fourth sub surface P22. The illuminating beams L1 passed through the third sub surface P21 at least passes through the inner display area 122 of the display panel 120 without passing through the non-display area 126 of the display panel 120. The illuminating beams L1 passed through the fourth sub surface P22 passes through the outer display area 124 of the display panel 120 without passing through the non-display area 126 of the display panel 120. The first sub surface P11, the second sub surface P12, the third sub surface P21 and the fourth surface P22 are planes. The first sub surface P11 and the third sub surface P21 are parallel to the display panel 120. The second sub surface P12 is parallel to the fourth sub surface P22. The second sub surface P12 and the fourth sub surface P22 are not parallel to the display panel 120.

Figure 17:
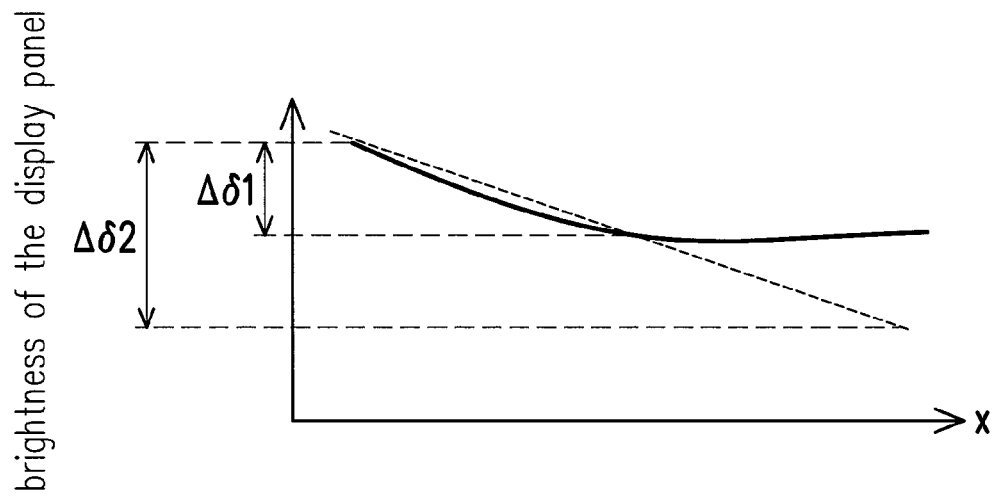
FIG. 17 illustrates a brightness distribution at an overlap region of the display panel and the first light emitting unit row (or the second light emitting unit row) depicted in FIG. 16.

With the design in which the top surfaces 114b of the portion of the light converging elements 114 being parallel to the display panel 120, and the top surface 114b of the other portion of the light converging elements 114 being inclined relative to the display panel 120, the display module 100B still achieve the effect of improving the light usability efficiency as similar to that of the display module 100A of FIG. 14. FIG. 17 illustrates a brightness distribution at an overlap region of the display panel and the first light emitting unit row (or the second light emitting unit row) depicted in FIG. 16, in which a x-axis refers to a position. For instance, x=0 represents a leftmost position in FIG. 16, a larger value of x represents the position that is closer to a rightmost position. Further, a y-axis refers to an average brightness, a full line refers to a brightness distribution of FIG. 6, and a dash line refers to a brightness distribution of the display module of a comparison example. Therein, a major difference between the display module of the comparison example and the display module of FIG. 12 is that: the driving unit 140 provides the same current to each of the light emitting units 110 in the display module of the comparison example. In view of FIG. 17, it can be known that, even if the display module 100B is managed to selectively make the driving unit 140 not to provide different currents to the light emitting units 110 (e.g., providing the same current to the light sources 112 of all of the lights emitting unit 110), a brightness difference $\Delta\delta1$ between the inner display area 122 and the outer display area 124 in the display panel 120 of FIG. 16 is less than a brightness difference $\Delta\delta2$ between the inner display area 122 and the outer display area 124 in the display panel 120 of the comparison example. In other words, in comparison to the display module of the comparison example, a displaying quality of images displayed by the display module 100B is better than that of the display module of the comparison example since the brightness distribution formed on the display panel 120 by the light emitting units 110 of the display module 100B may be more uniform. On the other hand, in comparison to the display module 100A of FIG. 12, the display module 100B may be provided without the driving unit 140 with special design and higher costs while realizing a certain degree of high displaying quality.

Figure 18:
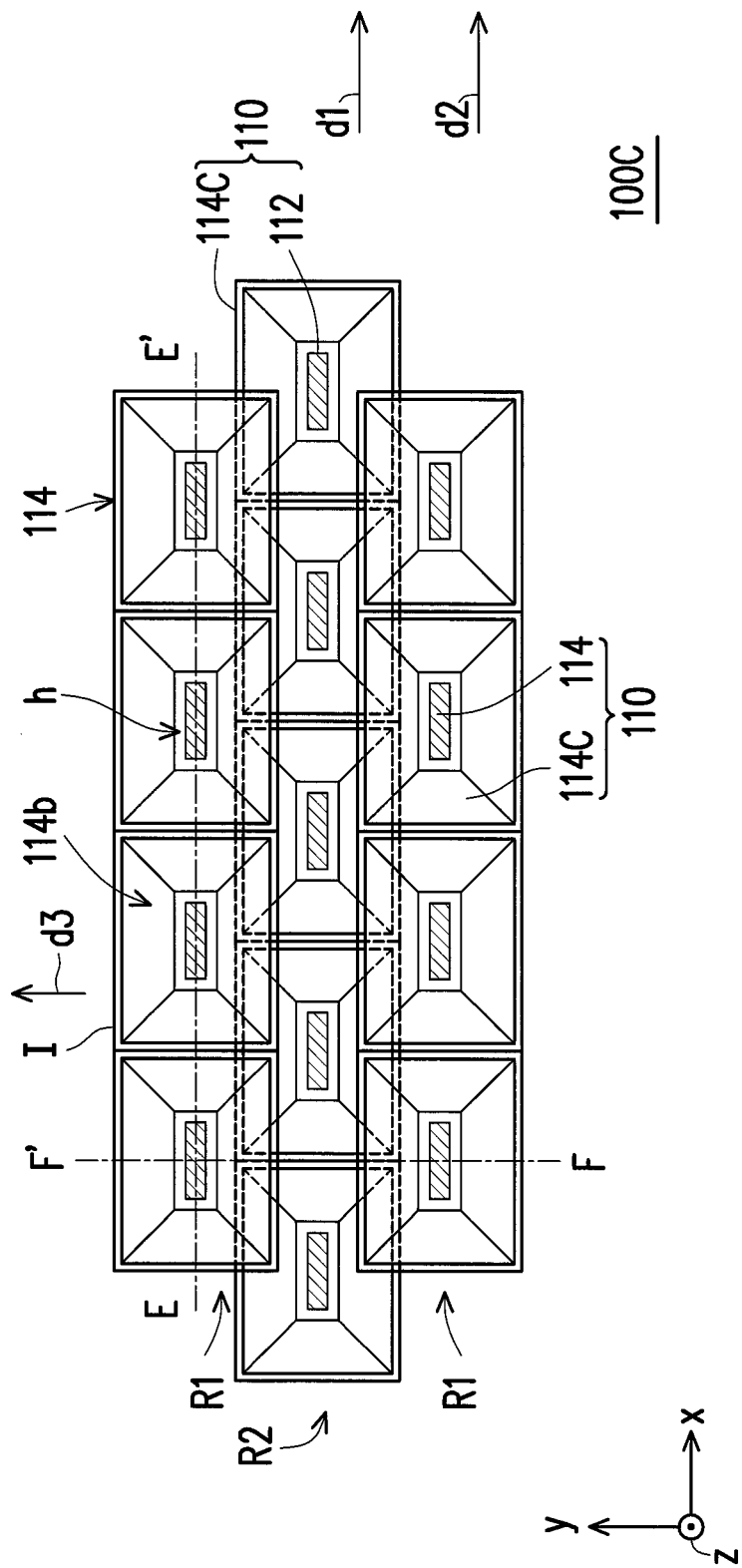
FIG. 18 is a top view of a display module according to still another embodiment of the invention.
Figure 19:
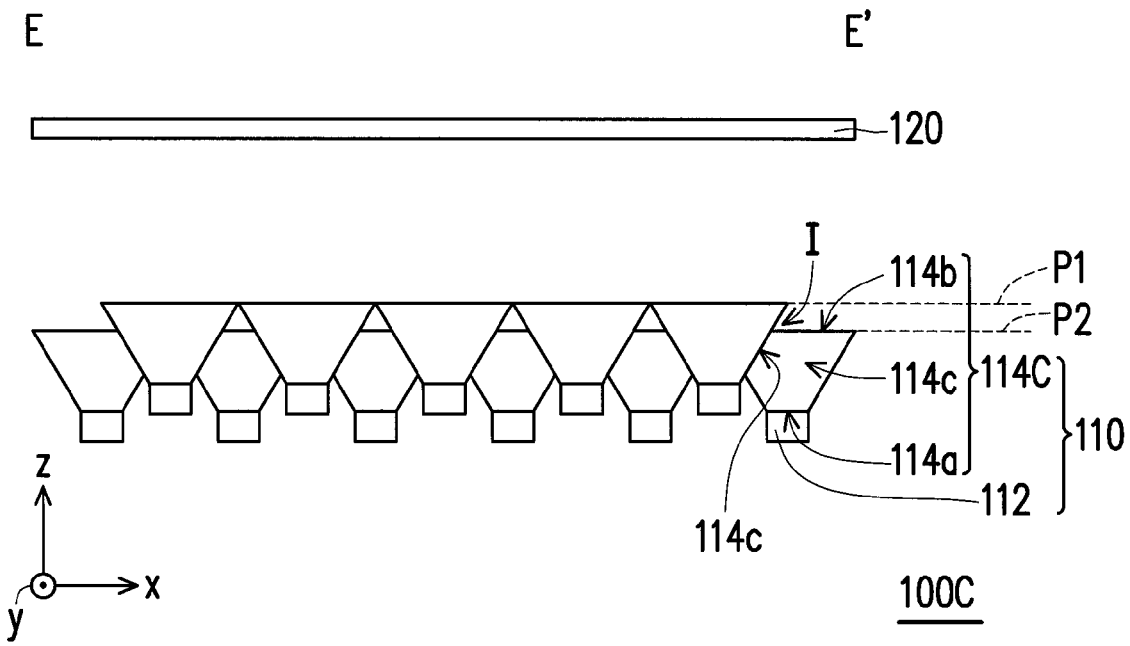
FIG. 19 is a cross-sectional diagram illustrating the display module depicted in FIG. 18 along a section line E-E'.
Figure 20:
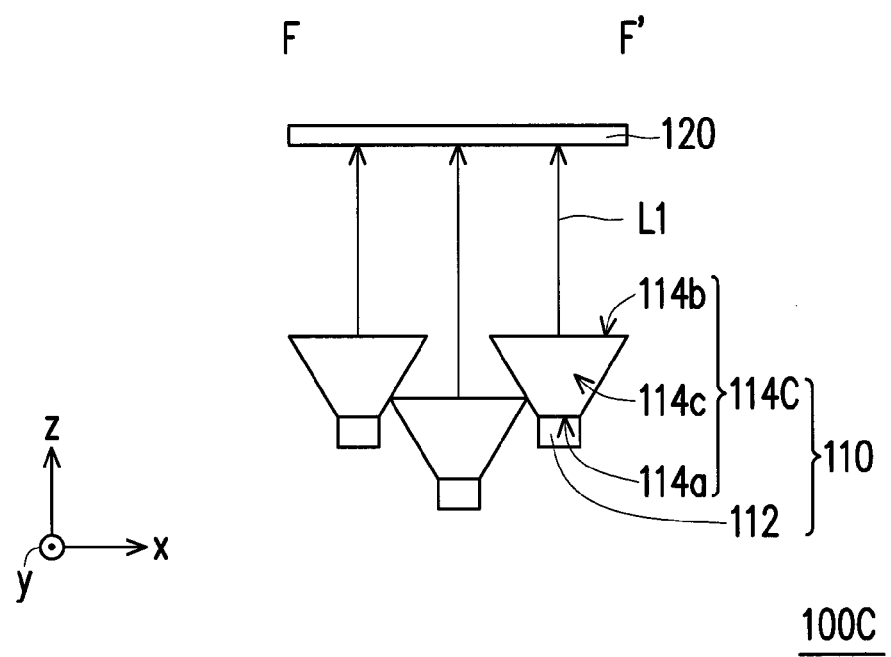
FIG. 20 is a cross-sectional diagram illustrating the display module depicted in FIG. 18 along a section line F-F'.

FIG. 18 is a top view of a display module according to still another embodiment of the invention. FIG. 19 is a cross-sectional diagram illustrating the display module depicted in FIG. 18 along a section line E-E'. FIG. 20 is a cross-sectional diagram illustrating the display module depicted in FIG. 18 along a section line F-F'. Referring to FIG. 18, FIG. 19 and FIG. 20 together, a display module 100C is similar to the display module 100, thus identical or corresponding elements are indicated by the same or corresponding reference numbers. Differences between the two is provided as follows; whereas the identical parts of the two may refer to the foregoing embodiments according corresponding reference numbers, thus related descriptions are omitted hereinafter.

Referring to FIG. 18, FIG. 19 and FIG. 20, the light emitting units 110 of the display module 100C are also divided into at least one first light emitting unit row R1 and a second light emitting unit row R2 adjacent to the first light emitting unit row R1. The top surfaces 114$b$ of the light converging elements 114C of the first light emitting unit row R1 are disposed on the same first surface P1. The top surfaces 114$b$ of the light converging elements 114C of the second light emitting unit row R2 are disposed on the same second surface P2. The first surface P1 is located between the display panel 120 and the second surface P2. An intersection I between the top surface 114$b$ and the peripheral surface 114$c$ of each of the light converging elements 114C of the second light emitting unit row R2 is in contact with the peripheral surface 114$c$ of at least one light converging element 114C of the first light emitting unit row R1.

Unlike the display module 100, the light converging elements 114C of the display module 100C are different from the light converging elements 114 of the display module 100 in forms, and relative positions between the light converging elements 114C are slightly different from relative positions between the light converging elements 114. More specifically, the light converging element 114C is a reflector. In other words, the light converging element 114C includes a base material and a reflection film formed on a surface of the base material, or formed by directly punching a high reflective material such as an aluminum material.

As shown in FIG. 18, in the display module 100C, an intersection I between the top surface 114$b$ and the peripheral surface 114$c$ of each of the light converging elements 114C is selectively be rectangular. Each of the light converging elements 114C includes an opening h, and the opening h exposes the corresponding light emitting unit 110. In other words, the light converging element 114C is hollow. The light converging elements 114C of the first light emitting unit row R1 are aligned in a first row direction d1. The light converging elements 114C of the second light emitting unit row R2 are aligned on a second row direction d2 parallel to the first row direction d1. Each of the light converging elements 114C of the first light emitting unit row R1 and one of the light converging elements 114C of the second light emitting unit row R2 are not aligned in a column direction d3 perpendicular to the first row direction d1. The display module 100C also includes effects and advantages similar to that of the display module 100, thus related description is not repeated hereinafter. In addition, the display module 100C is also applied in embodiments in which inclined planes are disposed (e.g., FIG. 12 or FIG. 16). Moreover, in the embodiment of FIG. 18, the light converging element 114C made of reflective material is rectangular, whereas in the embodiment of FIG. 12, the light converging element 114 formed by the second lens is circular, but the invention is not limited thereto.

Figure 21:
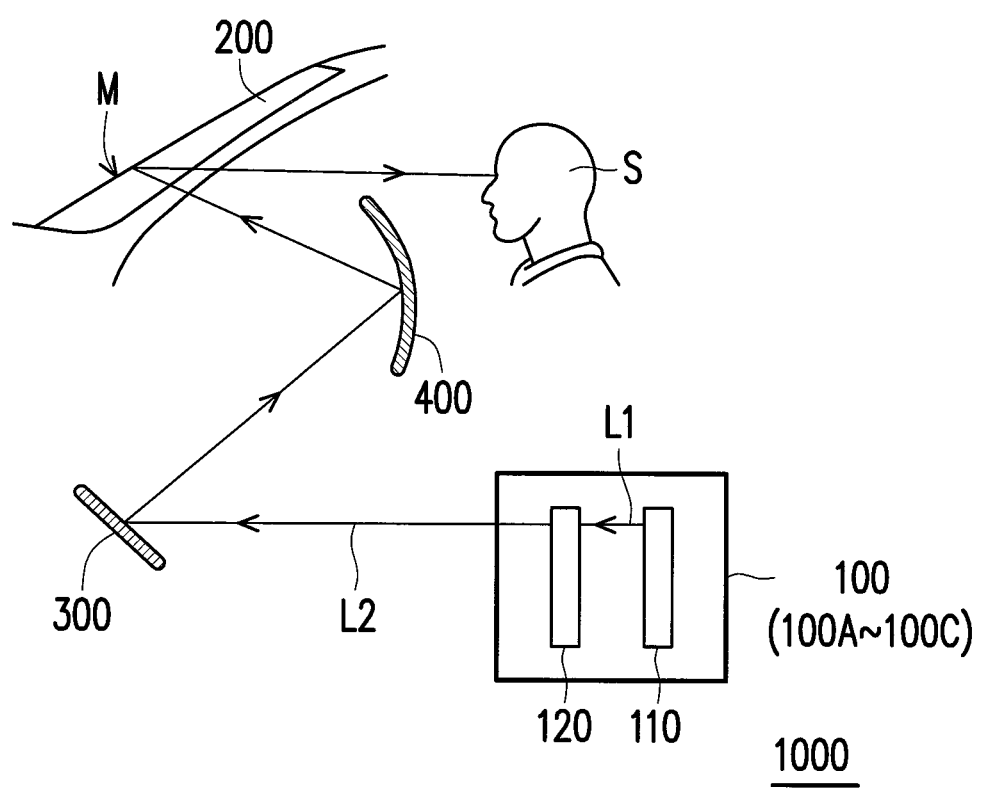
FIG. 21 illustrates a schematic diagram of a head up display according to an embodiment of the invention.

FIG. 21 illustrates a schematic diagram of a head up display according to an embodiment of the invention. Referring to FIG. 21, a head up display 1000 is disposed under a light transmissive windshield component 200 of a vehicle. In the resent embodiment, the vehicle may be, for example, a car. The light transmissive windshield component 200 is, for example, a windshield glass disposed in front of drivers. However, the invention is not limited thereto. In other embodiments, the vehicles are also trains, aircrafts, boats, submarines or vehicles of other types. Further, the light transmissive windshield component 200 is also a window next to a passenger who takes the vehicle, or light transmissive screens disposed on other positions. However, the invention is not limited thereto. Any of the display modules described in the foregoing embodiments may also be applied on a projector.

The head up display 1000 includes any of the display modules 100 and 100A to 100C as described above. In the display modules 100 and 100A to 100C, the illuminating beams L1 emitted by the light emitting units 110 pass through the display panel 120 to be converted into a plurality of image beams L2. The image beams L2 is projected on the light transmissive windshield component 200 of the vehicle to form an image M to be viewed by a user S.

More specifically, the head up display 1000 of the present embodiment optionally includes a first optical element 300 disposed in a transmitting path of the image beam L2. In the present embodiment, the first optical element 300 is, for example, a planar reflector. The first optical element 300 changes a transmitting direction of the image beams L2, so that the image beams L2 may be transmitted to the light transmissive windshield component 200 for imaging. Further, the head up display 1000 of the present embodiment optionally includes a second optical element 400. The second optical element 400 is disposed in the transmitting path of the image beams L2 from the first optical element 300. In the present embodiment, the second optical element 400 is, for example, a curved surface reflector. Besides that the second optical element 400 is capable of changing the transmitting direction of the image beams L2 again to extend a length of the transmitting path of the image beams L2 for increasing a size of the image M, the second optical element 400 also compensates optical aberration of the image M formed on the light transmissive windshield component 200 being a curved surface, so that the user S may view the image with favorable imaging quality. However, the head up display of the invention is not limited thereto, and the head up display may also utilize more optical elements based on different requirements. For instance, an optical path of the head up display may be composed of three reflective optical elements, or two reflective optical elements together with a lens element.

It should be noted that, the head up display 1000 is one of applications for the display module of the invention. The display module of the invention is not limited to only be applied as the head up display of the vehicle. Instead, the display module of the invention may also be applied in other appropriate occasions. For instance, a projector may be composed of the display module together with at least one appropriate optical element (e.g., one of a projector lens or a curved mirror). The projector may be applied in any occasions.

Based on above, in the display module and the head up display according to an embodiment of the invention, the light converging elements of the light emitting units on different rows are spaced apart in up and down manner and in contact to each other. Therefore, the gap between the light converging elements of two adjacent light emitting unit rows may be reduced, so as to increase the area of the overlap region projected on the display panel by the illuminating beams emitted by the two. Accordingly, the brightness at the region where the two adjacent light emitting unit rows are intersected is increased, so as to solve the problem of poor display in conventional art due to insufficient brightness at the region corresponding to where the two adjacent light emitting unit rows are intersected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display module, comprising:
a plurality of light emitting units, each of the light emitting units comprising:
a light source, suitable for emitting an illuminating beam; and
a light converging element disposed in a transmitting path of the illuminating beam, and comprising a bottom surface adjacent to the light source, a top surface far away from the light source and opposite to the bottom surface, and a peripheral surface connecting the bottom surface and the top surface; and
a display panel disposed in the transmitting path of the illuminating beam emitted by each of the light emitting units, wherein the light emitting units are divided into at least one first light emitting unit row and a second light emitting unit row adjacent to the first light emitting unit row, the top surfaces of the light converging elements of the first light emitting unit row are disposed on one first surface, the top surfaces of the light converging elements of the second light emitting unit row are disposed on one second surface, the first surface is located between the display panel and the second surface, and an intersection between the top surface and the peripheral surface of each of the light converging elements of the second light emitting unit row is in contact with the peripheral surface of at least one of the light converging elements of the first light emitting unit row.

2. The display module of claim 1, wherein the first surface and the second surface are both planes, and the first surface, the second surface and the display panel are parallel to one another.

3. The display module of claim 1, wherein the first surface and the second surface are both planes, the first surface is parallel to the second surface, and the first surface is not parallel to the display panel.

4. The display module of claim 1, wherein the light converging element of each of the light emitting units is a lens.

5. The display module of claim 1, wherein an intersection between the top surface and the peripheral surface of each of the light converging elements is substantially circular, one of the light converging elements of the second light emitting unit row is disposed between each adjacent two of the light converging elements of the first light emitting unit row, and one of the light converging elements of the first light emitting unit row is disposed between each adjacent two of the light converging elements of the second light emitting unit row.

6. The display module of claim 1, wherein the light converging element of each of the light emitting units is a reflector.

7. The display module of claim 1, wherein an intersection between the top surface and the peripheral surface of each of the light converging elements is substantially rectangular, the light converging elements of the first light emitting unit row are aligned in a first row direction, the light converging elements of the second light emitting unit row are aligned in a second row direction parallel to the first row direction, and each of the light converging elements of the first light emitting unit row and one of the light converging elements of the second light emitting unit row are not aligned in a column direction perpendicular to the first row direction.

8. The display module of claim 1, wherein the top surface of the light converging element of each of the light emitting units is located between the display panel and the bottom surface of the light converging element, the peripheral surface of the light converging element of each of the light emitting units is a ring surface, and an inner diameter of the ring surface is gradually increased from the bottom surface of the light converging element to the top surface of the light converging element.

9. The display module of claim 1, wherein the display panel has an inner display area, an outer display area surrounding the inner display area, and a non-display area surrounding the outer display area, the first surface comprises a first sub surface parallel to the display panel, and a second sub surface connecting to the first sub surface and inclined towards the display panel, the top surfaces of a portion of the light converging elements of the first light emitting unit row are disposed on the first sub surface, the top surface of a remaining portion of the light converging elements of the first light emitting unit row are disposed on the second sub surface, the illuminating beams passed through the first sub surface at least passes through the inner display area of the display panel without passing through the non-display area of the display panel, the illuminating beams passed through the second sub surface passes through the outer display area of the display panel without passing through the non-display area of the display panel, the second surface comprises a third sub surface parallel to the display panel, and a fourth sub surface connecting to the third sub surface and inclined towards the display panel, the top surfaces of a portion of the light converging elements of the second light emitting unit row are disposed on the third sub surface, the top surfaces of a remaining portion of the light converging elements of the second light emitting unit row are disposed on the fourth sub surface, the illuminating beams passed through the third sub surface at least passes through the inner display area of the display panel without passing through the non-display area of the display panel, the illuminating beams passed through the fourth sub surface passes through the outer display area of the display panel without passing through the non-display area of the display panel.

10. The display module of claim 9, wherein the first sub surface, the second sub surface, the third sub surface and the fourth surface are planes, the first sub surface, the third sub surface and the display panel are parallel to one another, the second sub surface is parallel to the fourth sub surface, and the second sub surface is not parallel to the display panel.

11. The display module of claim 1, wherein a number of the light emitting units of the first light emitting unit row is equal to a number of the light emitting units of the second light emitting unit row, and the display module further comprises:
a driving unit electrically connected to the light source of each of the light emitting units, the driving unit providing a plurality of first currents to the light sources of the first light emitting unit row, and the driving unit providing a plurality of second currents to the light sources of the second light emitting unit row, wherein a total of the first currents is less than a total of the second currents.

12. The display module of claim 1, further comprising:
a driving unit electrically connected to the light source of each of the light emitting units, the driving unit providing a third current to one of the light sources of the first light emitting unit row, the driving unit providing a fourth current to one of the light sources of the second light emitting unit row, the light emitting unit in which the t source receives the third current is in contact with the light emitting unit in which the light source receives the fourth current, a distance between the light emitting unit receiving the third current and the display panel is less than a distance between the light emitting unit receiving the fourth current and the display panel, and the third current is less than the fourth current.

13. A head up display disposed under a light transmissive windshield component of a vehicle, and the head up display comprising:
a display module, comprising:
a plurality of light emitting units, each of the light emitting units comprising:
a light source, suitable for emitting an illuminating beam; and
a light converging element disposed in a transmitting path of the illuminating beam, and comprising a bottom surface adjacent to the light source, a top surface far away from the light source and opposite to the bottom surface, and a peripheral surface connecting the bottom surface and the top surface; and
a display panel disposed in the transmitting path of the illuminating beams emitted by the light emitting units, the illuminating beams being converted into a plurality of image beams after passing through the display panel, the image beams being projected on the light transmissive windshield component of the vehicle to foini an image, wherein the light emitting units are divided into at least one first light emitting unit row and a second light emitting unit row adjacent to the first light emitting unit row, the top surfaces of the light converging elements of the first light emitting unit row are disposed on one first surface, the top surfaces of the light converging elements of the second light emitting unit row are disposed on one second surface, the first surface is located between the display panel and the second surface, and an intersection between the top surface and the peripheral surface of each of the light converging elements of the second light emitting unit row is in contact with the peripheral surface of at least one of the light converging elements of the first light emitting unit row.

* * * * *